(12) United States Patent
Stecker

(10) Patent No.: US 11,344,967 B2
(45) Date of Patent: *May 31, 2022

(54) ELECTRON BEAM LAYER MANUFACTURING

(71) Applicant: SCIAKY, INC., Chicago, IL (US)

(72) Inventor: Scott Stecker, Willow Springs, IL (US)

(73) Assignee: SCIAKY, INC., Chicago, IL (US)

( * ) Notice: Subject to any disclaimer, the term of this patent is extended or adjusted under 35 U.S.C. 154(b) by 708 days.

This patent is subject to a terminal disclaimer.

(21) Appl. No.: 16/250,425

(22) Filed: Jan. 17, 2019

(65) Prior Publication Data
US 2019/0143445 A1    May 16, 2019

Related U.S. Application Data

(63) Continuation of application No. 15/180,665, filed on Jun. 13, 2016, now Pat. No. 10,189,114, which is a
(Continued)

(51) Int. Cl.
*B33Y 10/00* (2015.01)
*B23K 15/00* (2006.01)
(Continued)

(52) U.S. Cl.
CPC .......... *B23K 15/0086* (2013.01); *B22F 12/00* (2021.01); *B23K 15/0013* (2013.01);
(Continued)

(58) Field of Classification Search
CPC .............. B33Y 10/00; B33Y 30/00; B23K 26/34–342; B23K 15/00; B23K 15/0045; B23K 15/0086
See application file for complete search history.

(56) References Cited

U.S. PATENT DOCUMENTS

| 3,562,575 A | 2/1971 | Paine |
| 3,601,575 A | 8/1971 | Meyer et al. |

(Continued)

FOREIGN PATENT DOCUMENTS

| EP | 0309930 B1 | 7/1992 |
| EP | 0417640 B1 | 12/1996 |

(Continued)

OTHER PUBLICATIONS

Seufzer and Taminger, "Control of Space-based electron Beam Free Form Fabrication" (accessed at ntrs.nasa.gov/archive/nasa/casi.ntrs.nasa.gov/20070030308_2007030399.pdf) (Oct. 23, 2007.).
(Continued)

*Primary Examiner* — Michael A Laflame, Jr.
(74) *Attorney, Agent, or Firm* — The Dobrusin Law Firm, P.C.; Bryan S. Lemanski

(57) ABSTRACT

A process for layer manufacturing comprising: (a) feeding raw material in a solid state to a first predetermined location; (b) depositing the raw material onto a substrate as a molten pool deposit under a first processing condition; (c) monitoring the molten pool deposit for a preselected condition using a detector substantially contemporaneously with the depositing step; (d) comparing information about the preselected condition of the monitored molten pool deposit with a predetermined desired value for the preselected condition of the monitored molten pool deposit; (e) solidifying the molten pool deposit; (f) automatically altering the first processing condition to a different processing condition based upon information obtained from the comparing step (d); (g) protecting the detector with a vapor protection device; and (h) repeating steps (a) through (g) at one or more second locations.

20 Claims, 10 Drawing Sheets

Related U.S. Application Data continuation of application No. 14/027,386, filed on Sep. 16, 2013, now Pat. No. 9,399,264, which is a continuation of application No. 12/883,340, filed on Sep. 16, 2010, now Pat. No. 8,546,717.

(60) Provisional application No. 61/243,242, filed on Sep. 17, 2009.

(51) Int. Cl.

| | | |
|---|---|---|
| *B23K 26/34* | (2014.01) | |
| *G05B 15/02* | (2006.01) | |
| *B22F 12/00* | (2021.01) | |
| *B33Y 30/00* | (2015.01) | |
| *B23K 15/02* | (2006.01) | |
| *B23K 15/06* | (2006.01) | |
| *G05B 19/4099* | (2006.01) | |
| *B33Y 40/00* | (2020.01) | |
| *B22F 10/10* | (2021.01) | |
| *B33Y 50/02* | (2015.01) | |

(52) U.S. Cl.
CPC .......... *B23K 15/0046* (2013.01); *B23K 15/02* (2013.01); *B23K 15/06* (2013.01); *B33Y 10/00* (2014.12); *B33Y 30/00* (2014.12); *G05B 15/02* (2013.01); *G05B 19/4099* (2013.01); *B22F 10/10* (2021.01); *B22F 2998/00* (2013.01); *B22F 2999/00* (2013.01); *B33Y 40/00* (2014.12); *B33Y 50/02* (2014.12); *G05B 2219/35134* (2013.01); *G05B 2219/49007* (2013.01); *Y02P 10/25* (2015.11)

(56) References Cited

U.S. PATENT DOCUMENTS

| | | |
|---|---|---|
| 3,601,649 A | 8/1971 | Steigerwald |
| 3,622,741 A | 11/1971 | Steigerwald |
| 3,702,951 A | 11/1972 | Kosmahl |
| 3,718,758 A | 2/1973 | Ponghis et al. |
| 3,730,962 A | 5/1973 | Norwalk |
| 3,745,320 A | 7/1973 | Baumgartner et al. |
| 3,752,952 A | 8/1973 | Ruge et al. |
| 3,764,850 A | 10/1973 | Kosmahl |
| 3,823,335 A | 7/1974 | Scheffels et al. |
| 3,842,236 A | 10/1974 | Von Walter |
| 3,875,366 A | 4/1975 | Von Walter |
| 4,080,546 A | 3/1978 | Steigerwald et al. |
| 4,093,843 A | 6/1978 | Lindstrom et al. |
| 4,131,914 A | 12/1978 | Bricmont |
| 4,160,149 A | 7/1979 | Scheffels et al. |
| 4,160,150 A | 7/1979 | Konig |
| 4,164,640 A | 8/1979 | Scheffels |
| 4,175,226 A | 11/1979 | Kappelsberger |
| 4,203,021 A | 5/1980 | Anderl et al. |
| 4,203,023 A | 5/1980 | Steigerwald et al. |
| 4,219,720 A | 8/1980 | Moench |
| 4,223,199 A | 9/1980 | Steigerwald et al. |
| 4,223,200 A | 9/1980 | Moench et al. |
| 4,229,639 A | 10/1980 | Koy et al. |
| 4,272,665 A | 6/1981 | Steigerwald |
| 4,317,983 A | 3/1982 | Scheffels et al. |
| 4,323,756 A | 4/1982 | Brown et al. |
| 4,348,576 A | 9/1982 | Anderl et al. |
| 4,429,401 A | 1/1984 | Avicola |
| 4,574,178 A | 3/1986 | Spruck |
| 4,654,506 A | 3/1987 | Sakamoto et al. |
| 4,677,273 A | 6/1987 | Colegrove et al. |
| 4,687,902 A | 8/1987 | Colegrove et al. |
| 4,794,259 A | 12/1988 | Sanderson |
| 4,898,317 A | 2/1990 | Ito et al. |
| 4,920,776 A | 5/1990 | Denzler |
| 4,927,992 A | 5/1990 | Whitlow et al. |
| 4,998,004 A | 3/1991 | Lawrence et al. |
| 5,065,029 A | 11/1991 | Krivanek |
| 5,089,686 A | 2/1992 | Fritz |
| 5,095,241 A | 3/1992 | Fritz et al. |
| 5,117,085 A | 5/1992 | Fritz et al. |
| 5,118,991 A | 6/1992 | Fritz et al. |
| 5,149,934 A | 9/1992 | Haynie et al. |
| 5,151,571 A | 9/1992 | Sanderson et al. |
| 5,162,906 A | 11/1992 | Yorita et al. |
| 5,294,771 A * | 3/1994 | Pratt ..................... B23K 15/02 219/121.14 |
| 5,534,314 A | 7/1996 | Wadley et al. |
| 5,557,110 A | 9/1996 | Itoh |
| 5,596,228 A | 1/1997 | Anderton et al. |
| 5,631,471 A | 5/1997 | Anderl et al. |
| 5,669,433 A | 9/1997 | Sterett et al. |
| 5,714,735 A | 2/1998 | Offer |
| 5,736,072 A | 4/1998 | Satoh |
| 5,736,073 A | 4/1998 | Satoh |
| 5,805,620 A | 9/1998 | Liu et al. |
| 5,869,801 A | 2/1999 | Paton et al. |
| 5,871,805 A | 5/1999 | Lemelson |
| 5,947,179 A | 9/1999 | Kinane et al. |
| 5,951,886 A | 9/1999 | Schubert et al. |
| 5,960,853 A | 10/1999 | Sterett et al. |
| 5,977,504 A | 11/1999 | Offer et al. |
| 6,040,545 A | 3/2000 | Taki et al. |
| 6,046,426 A | 4/2000 | Francisco et al. |
| 6,091,444 A | 7/2000 | McCarville et al. |
| 6,122,564 A | 9/2000 | Koch et al. |
| 6,143,378 A | 11/2000 | Harwell |
| 6,193,923 B1 | 2/2001 | Leyden et al. |
| 6,229,563 B1 | 5/2001 | Miller, II et al. |
| 6,395,151 B1 | 5/2002 | Schramm et al. |
| 6,399,945 B1 | 6/2002 | Hirayanagi |
| 6,401,001 B1 | 6/2002 | Jang et al. |
| 6,405,095 B1 | 6/2002 | Jang et al. |
| 6,441,338 B1 * | 8/2002 | Rabinovich ............... B26F 1/44 219/121.64 |
| 6,459,951 B1 | 10/2002 | Griffith et al. |
| 6,472,029 B1 | 10/2002 | Skszek |
| 6,561,259 B2 | 5/2003 | Spadafora et al. |
| 6,580,959 B1 | 6/2003 | Mazumder |
| 6,680,456 B2 | 1/2004 | Adams |
| 6,710,280 B2 | 3/2004 | Mazumder et al. |
| 6,778,209 B1 | 8/2004 | Eversole et al. |
| 6,793,140 B2 | 9/2004 | Mazumder |
| 6,815,685 B2 | 11/2004 | Wany |
| 6,859,681 B1 | 2/2005 | Alexander |
| 6,937,921 B1 | 8/2005 | Mazumder |
| 6,995,334 B1 | 2/2006 | Kovacevic et al. |
| 7,019,252 B2 | 3/2006 | Kloss |
| 7,020,539 B1 | 3/2006 | Kovacevic et al. |
| 7,073,561 B1 | 7/2006 | Henn |
| 7,107,118 B2 | 9/2006 | Orozco et al. |
| 7,168,935 B1 | 1/2007 | Taminger et al. |
| 7,262,385 B2 | 8/2007 | Fuson |
| 7,326,377 B2 | 2/2008 | Adams |
| 7,380,697 B2 | 6/2008 | Seki |
| 7,454,262 B2 | 11/2008 | Larsson |
| 7,479,632 B1 | 1/2009 | Gevelber et al. |
| 7,635,825 B2 | 12/2009 | Larsson |
| 7,648,740 B2 | 1/2010 | Slaughter |
| 7,765,022 B2 | 7/2010 | Mazumder et al. |
| 8,187,521 B2 | 5/2012 | Larsson et al. |
| 8,308,466 B2 | 11/2012 | Ackelid et al. |
| 8,344,281 B2 | 1/2013 | Taminger et al. |
| 8,598,523 B2 | 12/2013 | Stecker et al. |
| 8,992,816 B2 | 3/2015 | Jonasson et al. |
| 9,064,671 B2 | 6/2015 | Ljungblad et al. |
| 9,079,248 B2 | 7/2015 | Ackelid |
| 9,310,188 B2 | 4/2016 | Snis |
| 9,341,467 B2 | 5/2016 | Snis |
| 9,346,116 B2 | 5/2016 | Guldberg |
| 9,347,770 B2 | 5/2016 | Snis |
| 9,399,321 B2 | 7/2016 | Ljungblad |
| 9,406,483 B1 | 8/2016 | Lock |
| 9,468,973 B2 | 10/2016 | Ljungblad |
| 9,481,931 B2 | 11/2016 | Stempfer |

(56) References Cited

U.S. PATENT DOCUMENTS

| | | | |
|---|---|---|---|
| 9,543,116 B2 | 1/2017 | Lock | |
| 9,550,207 B2 | 1/2017 | Ackelid | |
| 9,664,504 B2 | 5/2017 | Snis | |
| 9,676,032 B2 | 6/2017 | Hellestam | |
| 9,764,386 B2 | 9/2017 | Brice | |
| 9,764,415 B2 | 9/2017 | Seufzer et al. | |
| 9,902,015 B2 | 2/2018 | Zimmerman | |
| 9,937,580 B2 | 4/2018 | Peters et al. | |
| 10,071,437 B2 | 9/2018 | Stecker et al. | |
| 2003/0075836 A1 | 4/2003 | Fong | |
| 2004/0245465 A1 | 12/2004 | Steigerwald | |
| 2004/0256364 A1 | 12/2004 | Kloss | |
| 2005/0173380 A1 | 8/2005 | Carbone | |
| 2005/0288813 A1 | 12/2005 | Yang et al. | |
| 2006/0050147 A1 | 3/2006 | Gao et al. | |
| 2006/0145381 A1 | 7/2006 | Larsson | |
| 2006/0192144 A1 | 8/2006 | Schubert et al. | |
| 2006/0196853 A1 | 9/2006 | Elmer et al. | |
| 2007/0017908 A1 | 1/2007 | Sercel et al. | |
| 2008/0296278 A1 | 12/2008 | Meckler | |
| 2008/0314878 A1 | 12/2008 | Cai et al. | |
| 2009/0134005 A1 | 5/2009 | Sato et al. | |
| 2010/0122901 A1 | 5/2010 | Weinstein et al. | |
| 2010/0260410 A1 | 10/2010 | Taminger et al. | |
| 2010/0270274 A1 | 10/2010 | Taminger et al. | |
| 2010/0325902 A1 | 12/2010 | Dutta et al. | |
| 2011/0008530 A1 | 1/2011 | Woods et al. | |
| 2012/0193335 A1 | 8/2012 | Guldberg | |
| 2014/0314609 A1 | 10/2014 | Ljungblad et al. | |
| 2015/0283613 A1 | 2/2015 | Backlund et al. | |
| 2015/0165525 A1 | 6/2015 | Jonasson | |
| 2015/0251249 A1 | 9/2015 | Fager | |
| 2015/0258626 A1 | 9/2015 | Seufzer et al. | |
| 2016/0052056 A1 | 2/2016 | Fager | |
| 2016/0318130 A1 | 11/2016 | Stempfer et al. | |
| 2017/0001253 A1 | 1/2017 | Stempfer | |
| 2017/0120386 A1 | 5/2017 | Lin et al. | |
| 2017/0136541 A1 | 5/2017 | Fager | |
| 2017/0173691 A1 | 6/2017 | Arcam | |
| 2017/0189964 A1 | 7/2017 | Backlund et al. | |
| 2017/0203386 A1 | 7/2017 | Satoh et al. | |
| 2017/0259338 A1 | 9/2017 | Ackelid | |
| 2017/0282248 A1 | 10/2017 | Lungblad et al. | |

FOREIGN PATENT DOCUMENTS

| | | |
|---|---|---|
| EP | 0417642 B1 | 4/1997 |
| EP | 1765003 A1 | 3/2007 |
| EP | 2119530 A1 | 11/2009 |
| JP | 11/179578 A | 7/1999 |
| JP | 56/151185 A1 | 7/1999 |
| WO | 99/36738 A1 | 7/1999 |
| WO | 2001/036146 A1 | 5/2001 |
| WO | 2004/020139 A1 | 3/2004 |
| WO | 2007/000069 A1 | 1/2007 |
| WO | 2009/077450 A2 | 6/2009 |
| WO | 2015/091269 A1 | 6/2015 |
| WO | 2016/064369 A1 | 4/2016 |

OTHER PUBLICATIONS

Sharma, "On Electron Beam Additive Manufacturing Process for Titanium Alloys"(Abstract for Session on Apr. 27, 2009 Spring 2009 AIChE National Meeting).

Matz, John, "Carbide Formation in a Nickel-Based Superalloy During Electron Beam Solid Freeform Fabrication," Jul. 30, 1999, pp. 1-94.

Dave', V. R. et al., "Electron Beam Solid Freeform Fabrication of Metal Parts," 1999, p. 64-71.

Taminger, Karen, "Airbus Materials and Structures Workshop," Metals & Thermal Structures Branch NASA Langley Research Center, Electron beam Freeform Fabrication Technology Development for Aerospace Applications, Apr. 6-7, 2006.

Taminger, Karen et al., "Electron Beam Freeform Fabrication in the Space Environment," Jun. 25-28, 2007.

Taminger, Karen et al., "Solid Freeform Fabrication: An Enabling Technology for Future Space Missions," Apr. 8-10, 2002.

Caryn Meissner, "Standardizing the Art of Electron-Beam Welding," S&TR, Mar./Apr. 2008, p. 11-13.

Beersiek Joerg, "New Aspects of Monitoring with a CMOS camera for Laser Materials Processing," published at ICALEO 2002, Section F206.

Plasma Monitor PM 7000.; Prometec GmbH, 2003.

J. Beersiek, T. Devermann, K. Behler; "Practical Applications of In-Process Monitoring For Laser Processes Not Only For Single Welds and Common Materials," 2004.

J. Beersiek; "A CMOS Camera as a Tool For Process Analysis Not Only For Laser Beam Welding," published at ICALEO 2001.

Process Monitoring System Welding Monitor PD 2000, 2006.

Process Control Laser Welding, Welding Monitor PD 2000, available at http://www.prometec.com/english/pages/contents/laser_pd2000_con.htm, last accessed Dec. 18, 2008.

R. Thompson, SCIAKY W2000, A Multiple Weld Process CNC Machine Controller, 1997.

W-2000 Computer Control System, p. 1-14, Mar. 2000.

Y. Fukui, "Modulation Transfer Function (MTF)," p. 1-2, Mar. 20, 2003.

S. Stecker, K.W. Lachenberg, H. Wang, and R.C. Salo, Electron Beam Free Form Fabrication Technology, International Institute of Welding, p. 1-13, Oct. 4, 2006.

Stecker, S., K.W. Lachenberg, H. Wang, and R.C. Salo, "Advanced Electron Beam Free Form Fabrication Methods & Technology," p. 35-46 Oct. 2006.

Photon Focus, High-Dynamic CMOS Cameras; available at http://www.photonfocus.com/html/eng/products/products.php?prodId=24 last accessed Sep. 2010.

K, Taminger; "Electron Beam Freeform Fabrication," 2005.

Davé, V. R.: "Electron Beam Assisted Materials Fabrication," Diss. Massachusetts Institute of Technology (MIT) (1995).

K. Taminger and R. Hafley; "Characterization of 2219 Aluminum Produced by Electron Beam Freeform Fabrication," Aug. 5-7, 2002.

K. Taminger and R. Haley; "Electron Beam Freeform Fabrication for Cost Effective Near-Net Shape Manufacturing," Mar. 2006.

V.R. Dave, J.E. Matz, T.W. Eagar; "Electron Beam Solid Freeform Fabrication of Metal Parts," p. 64-71, 1995.

Taminger, K. and R. Hafley; "Electron Beam Freeform Fabrication: A Rapid Metal Deposition Process"; Proceeding of the 3rd Annual Automotive Composites Conference SPE (2003).

Electron Beams: Useful for More than Just Microscopes, European Tool and Mouldmaking, Mar./Apr. 2002, http://www.tool-moldmaking.com/magazine/magdetail.php?company=2355&x=11&y=15, accessed Jul. 3, 2003.

J.E.Matz and T.W. Eagar; "Carbide Formation in Alloy 718 during Electron-Beam Solid Freeform Fabrication," vol. 33 A, Aug. 2002.

Hamilton Standard W2, Electron Beam Welder; http://www.wme-inc.com/WebPages/EBWpgs/HSDW-2EBW.htm; accessed Sep. 29, 2009.

Fuentek, NASA's EBF3: The Future of Art-to-Part Manufacturing, available at: http://www.fuentek.com/technologies/EBF3.htm, last accessed Sep. 11, 2009, pp. 1-7.

Martin, R. et al., "Reducing Costs in Aircraft: The Metals Affordability Initiative," available at: http:/www.tms.org/pubs/journals/JOM/0003/Martin-0003.html, accessed on Jan. 22, 2006, JOM 52(3) (2000) pp. 24-28.

Abbott et al., "Effects of Deposition and Thermal Processing Variables on Laser Additive Manufactured Ti-6A1-4V", 2003, Metals Affordability Initiative, AeroMat Jun. 11, 2003, pp. 1-25.

SAI Titanium Specialists, article available at: http://www.supraalloys.com/Machining_titanium.htm, last accessed Jan. 22, 2006.

Cooper, K., "Extending Rapid Prototyping Past the Horizon: Applications in Outer Space," Published Jan. 10, 2001. Abstract.

Lachenberg, K. "Electron Beam Free Form Fabrication (EBFFF) Processing Methods & Technology," Aeromat Jun. 25-28, 2007.

Copending U.S. Appl. No. 12/883,340, filed Sep. 16, 2010.

Potentially Related U.S. Appl. No. 12/902,520, filed Oct. 12, 2010.

(56) References Cited

OTHER PUBLICATIONS

Related Patent Application Office Action, U.S. Appl. No. 12/902,520, dated Oct. 4, 2012.
Potentially Related U.S. Appl. No. 13/029,306, filed Feb. 17, 2011.
Potentially Related U.S. Appl. No. 13/891,303, filed May 10, 2013.
Potentially Related U.S. Appl. No. 14/078,910, filed Nov. 13, 2013.
International Search Report and Written Opinion, Application No. PCT/US2010/049044, dated Sep. 16, 2010.
International Written Opinion, Application No. PCT/US2010/049044, dated Dec. 5, 2011.
International Search Report and Written Opinion, Application No. PCT/US2010/052261, dated Oct. 12, 2010.
Stecker, S. Characterization and application of weld pool oscillation phoenomenon for penetration control of gas tungsten arc welding, A Thesis-The Ohio State University (1996).
Nazarenko, O. "Welding Electron Beam Analyzer", available at http://www.nas.gov.ua/pwj/beam/i13 c.html, Copyright 1999-2008 last accessed Mar. 2, 2009.
Nazarenko, O. "Founded in 1976, Electron Beam Welding Department of PWI Brings Advanced Technology and Equipment From the Laboratory to Industry For Materials Processing Applications.", available at http://www.nas.gov.ua/pwj/beam/index.html, Copyright 1999-2009 last accessed May 11, 2009.
Nazarenko, O. "Range of the KL-109, KL-110, and KL-111 Universal Machines for Electron Beam Welding of Large and Thick-Walled Products" available at http://www.nas.gov.ua/pwj/beam/mach.html, Copyright 1999-2010 last accessed May 5, 2011.
Taminger, K. "Electron Beam Freeform Fabrication: A metal deposition apparatus to build components directly from CAD" WBT Showcase, Mar. 26-27, 2008, www.nasa.gov.
Brice, C.A., et al., "Rapid Prototyping and Freeform Fabrication via Electron Beam Welding Deposition," Proceeding of Welding Conference, (2002).
Touloukian, Y.S. and Ho, C.Y., thermal Radiative Properites of Metallic Elements and Alloys, IFI/Plenum (1970).
Hofmeister, W. "Thermal imaging and control of electron beam freeform fabrication (ebf3)" NASA Space Institute.
U.S. Appl. No. 61/167,540, filed Apr. 8, 2009.
Related Foreign Patent Application No. 2010295585 Office Action, IP Australia, Australian Government, dated Jul. 31, 2014.
IP Australia Patent Examination Report for Application No. 2015275236 dated Jul. 27, 2016.

* cited by examiner

ELECTRON BEAM LAYER MANUFACTURING

CLAIM OF BENEFIT OF FILING DATE

The present application claims the benefit of the filing date of U.S. Provisional Application No. 61/243,242, filed Sep. 17, 2009, the contents of which are hereby expressly incorporated by reference.

FIELD OF THE INVENTION

The present invention relates generally to layer manufacturing or fabrication of articles and, more specifically, to additive manufacturing or solid freeform fabrication of articles using electron beam energy and closed loop control technology.

BACKGROUND OF THE INVENTION

Free form fabrication (FFF) and additive manufacturing (AM) are names for a general class of layer manufacturing (LM), in which a three-dimensional (3-D) article is made by the sequential build-up of layers of material. Prior to physically building up the article, the process often begins with creating a computer aided design (CAD) file to represent the image or drawing of a desired article. Using a computer, information about this article image file is extracted, such as by identifying information corresponding to individual layers of the article. Thus, to derive data needed to form an article by LM, conceptually the article is sliced into a large number of thin layers with the contours of each layer being defined by a plurality of line segments or data points connected to form polylines. The layer data may be converted to suitable tool path data, such as data that is manipulated by or in the form of computer numerical control (CNC) codes, such as G-codes, M-codes, or the like. These codes may be utilized to drive a fabrication tool for building an article layer-by-layer.

One or more suitable LM techniques may be utilized for making articles, (e.g., such as by creating one or more device patterns directly on a substrate). The LM technique usually includes a step of selectively depositing material layer by layer, selectively removing material layer by layer, or a combination thereof. Many LM techniques are attractive in that they avoid the need for masks, for pre-existing three-dimensional patterns, and/or expensive tooling.

Historically, LM processes that use electron beams for melting a metal have been generally performed in an open loop fashion, which relies throughout substantially the entirety of the process upon human intervention, and particularly an operator, to adjust operating parameters. For example, an operator typically is obliged to visually observe the LM process throughout the layer by layer buildup, generally external of an LM apparatus and through a viewing port of the LM apparatus. If and when an operator detects a perceived departure from the buildup process, as forecasted, the operator needs to immediately change operating parameters. This approach may pose potential for complications due to the subjectivity of the observations of the operator, due to any delay experienced between an observation and any adjustment in operating parameters, and/or due to improper selection of parameters.

In recent years, there has been a growing need for a reliable system that reduces reliance upon human operators of LM processes and equipment. However, the art has yet to provide an effective solution.

Among the difficulties encountered in attempting to implement closed loop controls for LM techniques, and especially in the area of LM that employs layer by layer build up of articles using molten metal, has been the ability to suitably monitor deposits of metal. This is a particularly acute difficulty when attempting to conduct LM at relatively high output rates. For example, until the present invention, it has been impractical to use camera-based monitoring systems, especially monitoring systems that control metal deposition using overhead imaging of a metal deposit. Optics may be susceptible to vapor build-up that occurs during manufacturing. The amount of data and the rate at which images must be captured for analysis also has faced limitations due to camera hardware. By way of illustration, in achieving rapid imaging, heat may be generated by operation of the associated camera electronics; this may have the effect of corrupting images that are obtained. Overhead positioning of a camera also puts the camera at potential risk of image distortion due to pixel excitation by scattered electrons. Also, suitably robust, commercially practical, and compact designs for use, especially in LM, have been unavailable.

Accordingly, there continues to be a need in the art for an improved system for monitoring layer manufacturing to provide feedback controls for forming a three-dimensional article. More particularly, a system that provides automatic alteration of processing conditions based on information obtained from monitoring the layer manufacturing of the three-dimensional article.

Examples of efforts to provide layer manufacturing of articles and processes include those disclosed in U.S. Pat. Nos. 5,534,314; 5,669,433; 5,736,073; 5,871,805; 5,960,853; 6,401,001; 6,193,923; 6,405,095; 6,459,951; 6,680,456; 7,073,561; 7,168,935; and 7,326,377; and US Patent Application Nos. 20030075836; 20050173380; and 20050288813, all of which are incorporated by reference for all purposes. The possibility of closed loop controls for additive manufacturing of articles by electron beam fabrication processes is identified at col. 12, lines 8-15 in U.S. Pat. No. 7,168,935 (incorporated by reference). In Seufzer and Taminger, "Control of Space-based electron Beam Free Form Fabrication" (accessed at ntrs.nasa.gov/archive/nasa/casi.ntrs.nasa.gov/20070030308_2007030399.pdf) (incorporated by reference), the authors address a possible approach to a closed-loop control system. See also, Sharma, "On Electron Beam Additive Manufacturing Process for Titanium Alloys" (Abstract for Session on Apr. 27, 2009 Spring 2009 AIChE National Meeting) (incorporated by reference).

U.S. Pat. No. 6,091,444 (incorporated by reference) elaborates on some of the difficulties faced in imaging high temperature melts. The patent illustrates an example of a high temperature melt view camera that includes a water cooled enclosure with a pinhole in it, through which a gas is passed.

SUMMARY OF THE INVENTION

The present invention seeks to improve upon prior LM apparatus and processes by providing a unique process and apparatus for fabrication of articles utilizing electron beam energy and closed loop controls. The present invention may incorporate any of the teachings described in of U.S. Provisional Application No. 61/243,242, filed Sep. 17, 2009, the contents of which are hereby expressly incorporated by reference. The invention makes advantageous use of one or more unique features for allowing rapid article builds, especially aided by closed loop control operation, such as one or any combination of a vapor protective device as described herein, a cooled camera housing as described herein, an alignment fixture as described herein, substantially overhead imaging of molten pool deposits during a build as described herein, or any combination thereof.

The invention pertains generally to a process for layer manufacturing of a three-dimensional work piece comprising the steps of: feeding raw material in a solid state to a first predetermined location (e.g., in the form of a bead, such as an elongated bead such as from a wire that may have an average width of about 3 to about 20 mm, preferably about 10 to about 15 mm (e.g., about 12.7 mm)); depositing the raw material onto a substrate as a molten pool deposit under a first processing condition; monitoring the molten pool deposit for a preselected condition using an image generating device substantially contemporaneously with the depositing step (e.g. using an optical imaging device, such as a digital camera having: (i) electronic components enclosed in a temperature controlled housing; (ii) a vapor protection device; or (iii) both (i) and (ii)); comparing information about the preselected condition of the monitored molten pool deposit with a predetermined value for the preselected condition of the monitored molten pool deposit; solidifying the molten pool deposit; automatically altering the first processing condition to a different processing condition based upon information obtained from the comparing step; and repeating the above steps at one or more second locations for building up layer by layer a three-dimensional work piece. The steps may be performed at a rate sufficient to deposit successive layers at least about 0.5 cm$^3$/hr to at least about 2.0 cm$^3$/hr (e.g. about 1.54 cm$^3$/hr), more preferably at least about 2.0 cm$^3$/hr to at least about 5.0 cm$^3$/hr. The steps may be performed at a rate sufficient to deposit successive layers at least about 2.5 kg of the raw material per hour, preferably at least 3 kg per hour (e.g., about 3.3 to about 6.8 kg per hour or higher). The steps may be performed at a rate sufficient to deposit the raw material as a plurality of beads that define successive layers having an average bead width of about 10 to about 15 mm (e.g., about 12.7 mm) at a rate of at least about 25 cm of bead per minute (e.g., about 35 to 80 cm per minute or higher).

The present invention in addition to a monitoring step may include a step of cooling a detector by flowing a fluid in a housing of the detector for removing heat from the detector, wherein the cooled camera housing comprises: a front flange; at least one spacer pad connected to the front flange; at least one seal adjoining the spacer pad (e.g., located in-between a plurality of spacers, the front flange and spacers, or both); a rear flange connected to the front flange and sandwiching therebetween the at least one spacers and seals; wherein the front flange, the at least one seal, the at least one spacer pad, and the rear flange form an interior cavity; a plurality of printed circuit boards located within the interior cavity; an image detector; and wherein at least one of the flanges (e.g., the front flange) includes an inlet, an outlet, a fluid passage between the inlet and the outlet through which the fluid is passed for cooling the printed circuit boards during their operation, and optionally a mount adapter.

The present invention also contemplates an apparatus for LM fabrication of a three-dimensional article comprising: a material delivery device for delivering raw material in a solid state; an electron beam gun energy emission device that emits electrons for melting the raw material to form a molten pool deposit; a work piece support upon which a work piece is formed layer by layer from a plurality of successively deposited molten pool deposits; a detector that monitors a preselected condition of the deposited material; a closed loop electronic control device for controlling operation of one or more components of the apparatus in response to a detected condition by the detector, and a housing defining a chamber within which the work piece is formed layer by layer from a plurality of successively deposited molten pool deposits; wherein the relative positions of two or more of the material delivery device, the energy emission device, the work piece support, or the detector changes during use of the system in at least the x, y, and z orthogonal axes for layer by layer buildup of an article.

The apparatus may have associated with it an alignment fixture that is configured to allow for adjustment of an electron beam gun (and optionally a beam deflector), the detector, or both relative to each other and a known position of a work piece and/or work piece support. The present invention affords a robust system for gathering valuable data about a melt pool deposit substantially in real time. By way of illustration, the detectors may be capable of capturing and process at least about 25, 30, 40, 50, or even 60, or more images per second. The processes herein contemplate operating the detectors at such rates or faster rates. In this manner, substantially real time data may be obtained about the deposited material that takes into account dynamic and unpredictable thermal conditions experienced by the work piece as a result of the layer by layer buildup and ongoing changes to dimensions and geometries of the work piece. The alignment fixture may comprise: a support structure with a base portion and a guide surface portion; an adjustable height work piece support simulator carried on the support structure that raises and lowers relative to the base portion along the guide surface portion; an energy emission device orientation simulator disposed above the work piece support simulator on the support structure, the energy emission device orientation simulator including an interface for alignment of mounting a detection device, an interface for alignment of mounting of a deflection coil, or both.

The apparatus may have associated with it a vapor protection device that comprises: a block that includes a base portion and a cover portion, the base portion including at least one fluid port that receives a gas stream that may be controllably regulated, the base portion and the cover portion each having an aperture that is generally axially aligned with each other and is adapted to be axially aligned substantially overhead of a molten metal pool deposit; at least one reflective substrate that is in optical communication with at least one of the apertures of the cover portion, or the base portion, for reflecting an image that passes through such aperture to a separately housed optical imaging device that records the image; wherein the gas stream enters the at least one fluid port and exits the block through one of the apertures, and provides an optically transparent protective barrier to prevent passage of metal vapor through the other aperture.

It should be appreciated that the above referenced aspects and examples are non-limiting as others exist with the present invention, as shown and described herein. For example, any of the above mentioned aspects or features of the invention may be combined to form other unique configurations, as described herein, demonstrated in the drawings, or otherwise.

DETAILED DESCRIPTION OF THE INVENTION

The present invention provides an apparatus and process for layer manufacturing (LM) of a three-dimensional article. The invention is particularly directed at an apparatus and process for LM that provides high output rates. For example, it is possible that article (e.g., metallic article) build rates of at least about 0.5, 1.0, 1.5, 2.5, 3.5, or even 4.0 cm$^3$/hr, or higher, may be employed. It is also possible that, article (e.g., metallic article) build rates of at least about 2.5, 3.0, 3.3, 5, or even 6.8 kg/hour (e.g. having an average bead width of about 10 to about 15 mm) may be employed.

In general, the apparatus may include combinations of at least two or more of a material delivery device (e.g. a wire feed device); an energy emission device that applies energy to liquefy a material (e.g., a metal) delivered by the material delivery device; a work piece support onto which liquefied material is deposited; a closed loop control device (e.g., one that is in signaling communication with at least one or more of the material delivery device, energy emission device, or work piece support); a detector (e.g. a digital camera having (i) electronic components enclosed in a temperature controlled housing; (ii) a vapor protection device; or (iii) both (i) and (ii)) that detects a condition of material that has been deposited (e.g., by employing at least one solid state sensing device for generating an image of the deposited material substantially in real time) and supplies information about the condition to the control device so that the control device can change an operating parameter in response to the detected condition; and a housing that at least partially encloses some or all of the above components. In general, the process may include supplying a material (e.g., a wire feed material); liquefying the material (e.g., by applying energy, such as from an electron beam); depositing liquefied material onto a work piece support as a molten pool deposit; monitoring the molten pool deposit; and controlling operation of the process using a closed loop control system for changing an operating parameter in response to a detected condition of the molten pool deposit. The apparatus and the process may make use of an optical imaging detector that captures and processes data about images substantially in real time, and particularly a camera system that: (i) may be operated at a rate of at least about 25, 30, 40, 50, or even 60 or more frames per second; (ii) may derive its images substantially overhead of the melt deposit; (iii) may be operated for extended periods (e.g., at least 8, 24, 72, or even 144 hours or longer) without buildup of image distorting vapors on any optical components; (iv) includes processing electronics that are maintained at a temperature below about 500, 400, 200, or even 100° C.; or any combination of (i)-(iv).

Figure 1A:
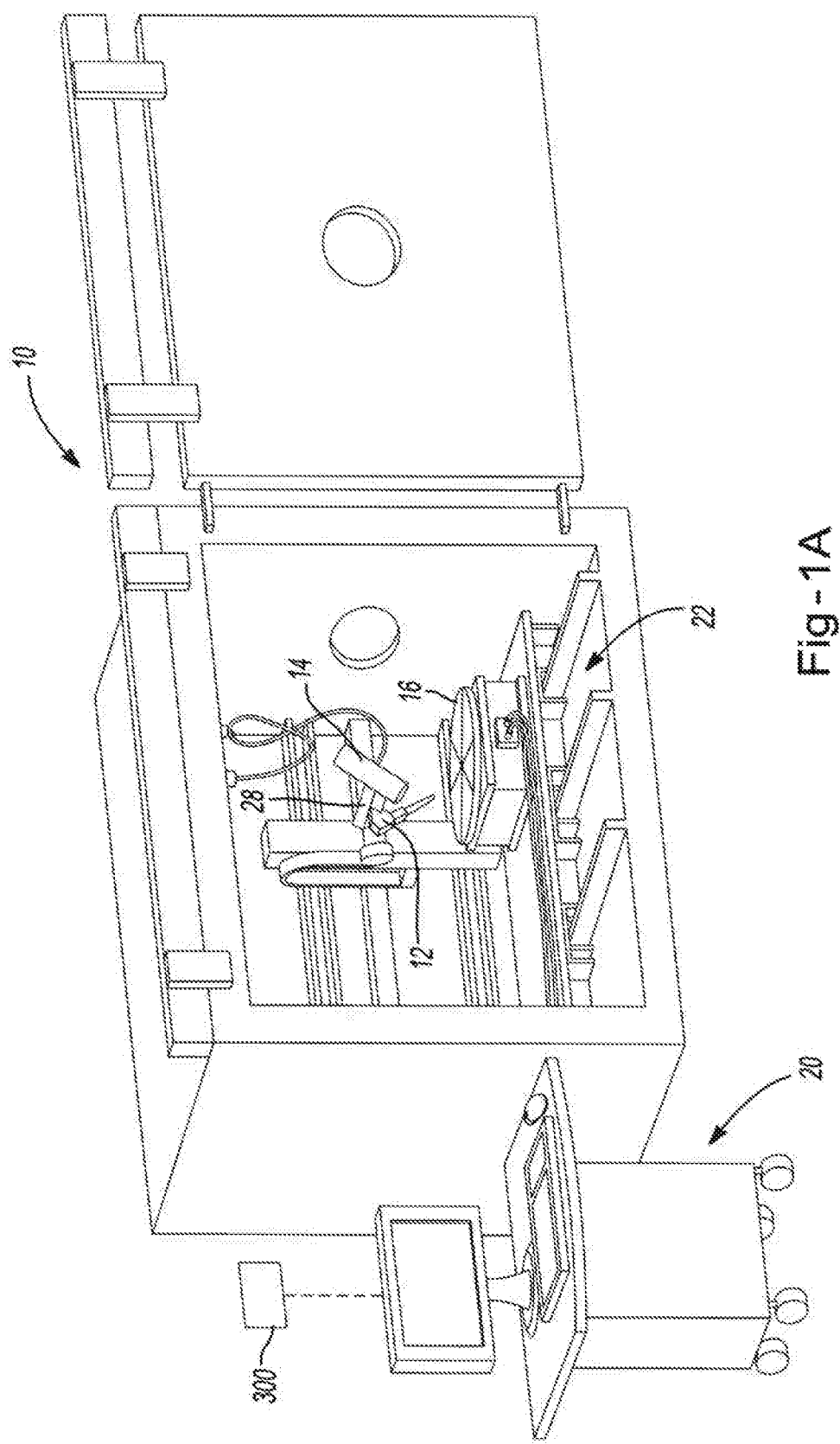
FIG. 1A is a general perspective view of an example of hardware useful for a system in accordance with the present teachings and a view of a chamber of an apparatus of the present teachings.
Figure 1B:
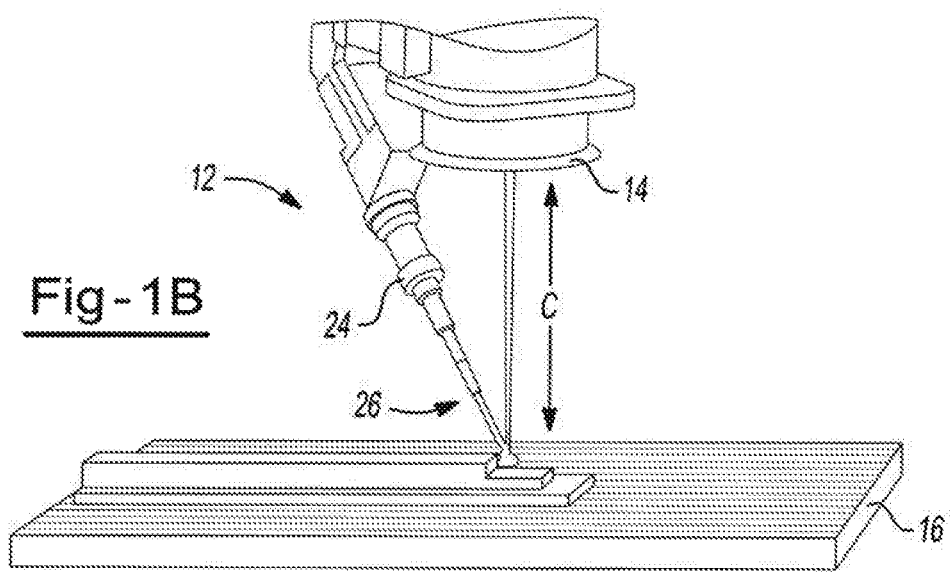
FIG. 1B is a perspective view illustrating generally a layer by layer deposition approach.

As illustrated in FIGS. 1A-1B, the present invention may include a LM apparatus 10 that includes a material delivery device 12 for delivering raw material in a solid state (which may include at least one metal, which may be in the form of a wire); an energy emission device 14 (e.g., an electron beam gun that controllably emits an electron beam); a work piece support 16 (e.g., a support that is motor-translated); a detector (e.g. including a camera); an electronic control system with a suitable control device 20 (preferably including at least one microprocessor); and a chamber 22. At least a portion of one or more of the components (e.g., the control system, a computer, or both) may reside outside of the chamber. The control system may be in controlling communication with one or more of the material delivery device 12, energy emission device 14, work piece support 16, or detector. The energy emission device 14 emits energy for melting the raw material to form a molten pool deposit on a work piece support (e.g., onto a previous layer deposited onto a work piece support). The work piece support 16, the energy emission device 14, and/or the material delivery device 12 may be positionally translatable relative to each other, so that a work piece can be formed layer by layer from a plurality of successively deposited (and solidified) molten pool deposits.

The detector 18 (FIGS. 2-3B) monitors (e.g., using an optical technique) a preselected condition of the deposited material, for example, bulk average temperature of the molten pool deposit, temperature gradient within the molten pool deposit, surface topography of the molten pool deposit, the presence of any liquid-solid interface in the molten pool deposit, surface profile (e.g., shape) of the molten pool deposit, chemical analysis of the molten pool deposit, raw material entry location, raw material height, raw material orientation, or any combination thereof. The detector may obtain an image from a location substantially overhead of the molten pool deposit so that a material feed wire may be imaged substantially as the wire is melted. The detector may communicate (directly or indirectly via another microprocessor that signally communicates with the control system) information obtained about the preselected condition to the closed loop electronic control device 20.

The closed loop electronic control system may then signally control (directly or indirectly) operation of one or more components of the apparatus in response to a detected condition. The control device may operate by altering one or more conditions. For example, one or more of the conditions altered may be the location of any energy emission device for supplying energy to melt the raw material; the location of any material delivery device used for feeding the raw material; the location of the work piece support upon which a work piece is built; the pressure of any environment in which the processing is performed; the temperature of any environment in which the processing is performed; the voltage or other energy supplied to melt the raw material; the beam used for any electron beam source of energy for melting the raw material (e.g., the beam focus, the beam power, beam raster pattern, or otherwise); the feed rate of the raw material; the composition of the deposited material; the temperature of the work piece; the temperature of the platform; or any combination thereof. The detector and control device make it possible to perform an LM process automatically, and especially without the need for operator intervention (e.g., without the need for complete reliance upon subjective human operator observations about operating conditions, without the need for complete reliance upon manual adjustment of one or more operating parameters by a human operator, or both).

Use of the processes and apparatus may require a vacuum, so that a reduction of pressure below atmospheric pressure is achieved. Thus, the apparatus may have its components at least partially enclosed within a walled structure defining a chamber 22, which may be sealed, and within which the work piece may be formed layer by layer from a plurality of successively deposited molten pool deposits. The relative positions of two or more of the material delivery device, the energy emission device, the work piece support, or the detector may change during use of the processes and apparatus herein.

The LM apparatus 10 includes a material delivery device 12 (FIG. 1A) for delivering raw material in a solid state. The material delivery device 12 may be structurally connected to a wall defining the chamber 22 either via direct structural attachment or via an arm 28 (FIG. 1A) that permits reorientation of the material delivery device 12 with respect to the energy emission device 14. The material delivery device may include one or more frame structures that carry individual components, for example, a raw material holder (e.g., an arm that rotatably carries a spool of wire), a wire straightener, a motor, a sensor, or any combination thereof. Optionally, the material delivery device 12 may be adapted so that it is mounted to a portion of the energy emission device (e.g., a wire feed device may be mounted to an electron beam gun). The material delivery device may attach via direct structural attachment or via a positioning mechanism that permits desired orientation of the material delivery device 12 with respect to the energy emission device 14. The raw material positioning device may be configured for orientating the position of the raw material feed relative to the energy emission device, preferably so that as raw material is advanced (e.g., continuously, intermittently, or both) by the material delivery device, and the raw material is delivered into a path of energy emitted by the energy emission device (e.g., wire is fed into the path of an electron beam). The energy emission device, the wire feed device, or both, may be configured to translate over at least 3 axes of translation (e.g., over the x, y and z axes of a Cartesian coordinate system), and possibly even over 4, 5, or even 6 axes of translation. Thus, the raw material positioning mechanism may orientate the direction of the raw material feed relative to the energy source being emitted from the energy emission device, the molten pool, the work piece, or any combination thereof as the volume of the work piece increases.

The material delivery device 12 may include a straightening mechanism, at least one feed motor, feed sensors, a raw material supply and/or containment unit, or any combination thereof. Power required to operate the raw material feed motors (drive and tensioning) of the material delivery device 12 may be supplied from power via the at least one electrical feed-through discussed herein. Examples of welding wire supply and straightening devices are described in U.S. Pat. Nos. 4,898,317; 4,920,776; and U.S. Patent Application No. 20080296278, all incorporated by reference for all purposes. A suitable wire feed device thus may include a motor driven feeding mechanism including a pair of rollers that feeds a wire therebetween. As described in U.S. Patent Application No. 20080296278, incorporated by reference, optionally there may be a tension controller that adjusts a tension between at least one pair of rollers, a wire speed sensor that measures wire feed speed, and a control circuit that compares a driven speed of the wire with the feed speed of the wire. The tension controller may also adjust the tension between the rollers.

The raw materials used by the LM process may include one or a combination of alloys of metals (e.g., metals including a transition metal or an alloy thereof). Examples of raw materials that may be used are: titanium, aluminum, iron, nickel, chromium, (e.g., inconel), cobalt, stainless steel, niobium, tantalum, copper, bronze, brass, beryllium, copper, vanadium, or tungsten. Particular examples of materials useful in the present technology are titanium and alloys of titanium (e.g., also including aluminum, vanadium, or both), such as one including titanium in a major amount (or substantially the balance) and about 3-10 wt % Aluminum (Al) (more preferably about 6 wt %), and 0 to about 6 wt % Vanadium (V) (more preferably about 4 wt %)). The raw material may be supplied and/or fed in various shapes and sizes. In one preferred embodiment, the raw material is provided in the form of a wire feed stock. The raw materials may be provided in an already heat-treated (e.g., tempered) condition. It is also possible that the raw material may be provided in a powder material form, in which case, the material delivery device will be configured to include a suitable metering device for delivering a predetermined quantity of powder.

The material delivery device 12 may be adjustable so that it is capable of feeding relatively large or even relatively small diameter wires (e.g., wires supplied by a wire spool, may have a diameter of about 5 mm or below, about 3 mm or below, or even about 1 mm or below) at both high and low speeds. The material delivery device may include one or more guide structures (e.g. one or more guide tubes 24) that help control wire position. It is also possible that a plurality of wires (of the same or different material type) may be fed from one or more material delivery devices 12, at one or more angles and/or distances from the molten pool deposit.

The LM apparatus 10 includes an energy emission device 14 that emits energy (e.g., using an electron beam gun or some other source of energy, such as a laser) for melting the raw material to form a molten pool deposit. The energy emission device 14 may be structurally supported in the chamber 22, as seen in FIG. 1A-1B, via a suitable structural attachment or positioning mechanism (e.g., arm 28), which may also carry the material delivery device. The structural attachment or positioning mechanism may be adjustable. For example, it may include one or more attachment features (e.g., fasteners or the like) that allow it to be secured in a fixed position and loosened or otherwise released for adjustment or re-positioning. The emission device may be configured for orientating the position of the energy beam relative to the work piece and/or work piece support. It may have at least 3, 4, 5, or even 8 axes of translation (e.g., over at least the x, y, and z axes of a Cartesian coordinate system). For example, the energy emission device 14 may be configured to move an electron beam gun using translation in X, Y, Z, tilt in one or more of the X-Y, X-Z, or Y-Z planes, or some other rotation to position the energy beam at a predetermined location relative to the work piece and/or the work piece support.

Power required to operate the energy emission device 14 may be supplied from one or more suitable power sources. For example, power may be supplied via at least one electrical feed-through power supply. The power source may deliver power greater than about 10 kilowatts (kW) or even greater than about 30 kW. The power source may deliver power up to about 100 kW (e.g., up to about 50 kW). The energy emission device may be signally connected to one or more processor (e.g., a processor of a controller, a computer, or otherwise) for controlling the energy output from the power supply. The processor may be included in the closed loop electronic control device or may be part of a separate computer and/or controller, which is operated by the closed loop electronic control device. One example of one approach for closed loop control is illustrated in Ser. No. 61/319,365, filed Mar. 31, 2010, the contents of which are incorporated by reference herein.

A preferred energy emission device may include an electron beam generator that may focus a supply of electrons against the raw material (e.g., an electron beam gun). Upon contact with the raw material, the electrons may heat the raw material to cause the raw material to soften, vaporize, and/or melt, and thereby introduce the raw material into a molten deposit. For example, the energy emission device may generate an electron beam (which may be focused to a desired beam width or span). The electron beam may be achieved with a low accelerating voltage, preferably between about 3 kV to about 80 kV, more preferably about 10 to 60 kV, and even more preferably between 35 and 55 kV; with a maximum beam power in the range of up to about 10 to about 15 kW (e.g., about 3 to about 5 kW); by using about 100 V about 600 V (e.g., 110 V) input power; or any combination thereof. Preferably, the energy emission device may be operated so there is sufficient power density for the electron beam freeform fabrication process, while still providing suitable radiation shielding. The processes herein may operate the energy emission device within some or all of the above parameters.

One approach to the operation of an electron beam gun may be to maintain the parameters of the gun at a sufficient level so that the maximum depth of a molten pool deposit may be about 3 cm or less, more preferably about 1 cm or less, and possibly even about 0.5 cm or less. It is possible that the beam may be operated in a generally defocused mode. For the deposition of a material, the beam may be rastered in a suitable pattern, such as generally non-circular pattern (e.g., an elliptical pattern, a linear pattern, a polygonal pattern, or any combination thereof). For example, a beam having a width of about 0.5 to about 0.8 mm may be rastered to cover an effective width of about 1.0, 2.0, 3.0 mm, or larger. In this manner, a relatively large amount of energy may be dispersed over a relatively large area, but to a relatively shallow depth, as compared with traditional electron beam welding.

The processes also contemplate operating the energy emission device variably or constantly within some or all of the above parameters. For instance, in response to a detected condition, one or more of the above parameters may be varied by a signal sent from a closed loop control device as taught herein. By way of example, the operation of the energy emission device may be controlled in a suitable manner to achieve a preselected size for a deposited melt pool. The size of the deposited melt pool may be measured by the detector 18 (e.g., metal melt pool deposits are controlled to maintain successively deposited layers so that they exhibit a melt pool diameter or width of about 0.3 mm to about 20 mm or even about 0.5 mm to about 13 mm).

To the extent not taught expressly herein, or elsewhere herein, other art-disclosed operational parameters may be employed, such as are disclosed in U.S. Pat. No. 7,168,935, incorporated by reference (see, e.g., cols. 5, 9, and the claims). Other art disclosed energy emission devices may be employed alone or in combination with an electron beam gun, such as a laser.

The LM apparatus 10 may include a work piece support 16 (FIG. 1A) upon which a work piece may be formed layer by layer from a plurality of successively deposited molten pool deposits (see, e.g., FIG. 1B), and which may provide a suitable conductive path of the electron beam (when on) in order to help avoid static build-up. The work piece support 16 may include a positioning mechanism (e.g., a stepper motor, a servo motor, or some other motor) for moving the work piece support 16 while optionally allowing the energy emission device 14 or another component to remain stationary. It is possible that the work piece support 16 may be maintained generally stationary while moving the energy emission device or another component. The work piece support 16 may further include at least one positioning sensor (e.g., rate and location sensors); at least one positioning motor; one or more power lines; or any combination thereof. The work piece support 16 may translate over at least 3 axes of translation (e.g., over the x, y, and z axes of a Cartesian coordinate system), more preferably translates linearly and rotationally over a total of at least four, five, or even six axes (e.g., at least the X, Y, and Z axes). The work piece support 16 may rotate, clockwise, counterclockwise, or both around any of the axes. The work piece support 16 may be capable of moving entirely or partially outside of the chamber 22.

Layer manufacturing according to the present teachings may orient an energy beam (e.g., an electron beam) vector substantially normal to the surface on which the deposit is being built. This tilt capability (e.g., positioning mechanism) enables positioning of the work piece support at different angles from 0° (platform normal is parallel to the energy beam vector) to 90° (platform normal is perpendicular to the energy beam vector) to allow enhanced flexibility and capability to build complex geometries, which may include undercuts, overhangs, hollow sections, or any combination thereof. As can be appreciated using traditional manufacturing techniques this has been difficult to fabricate without expensive tooling, coring operations, and/or secondary processing (e.g., machining).

Figure 2:
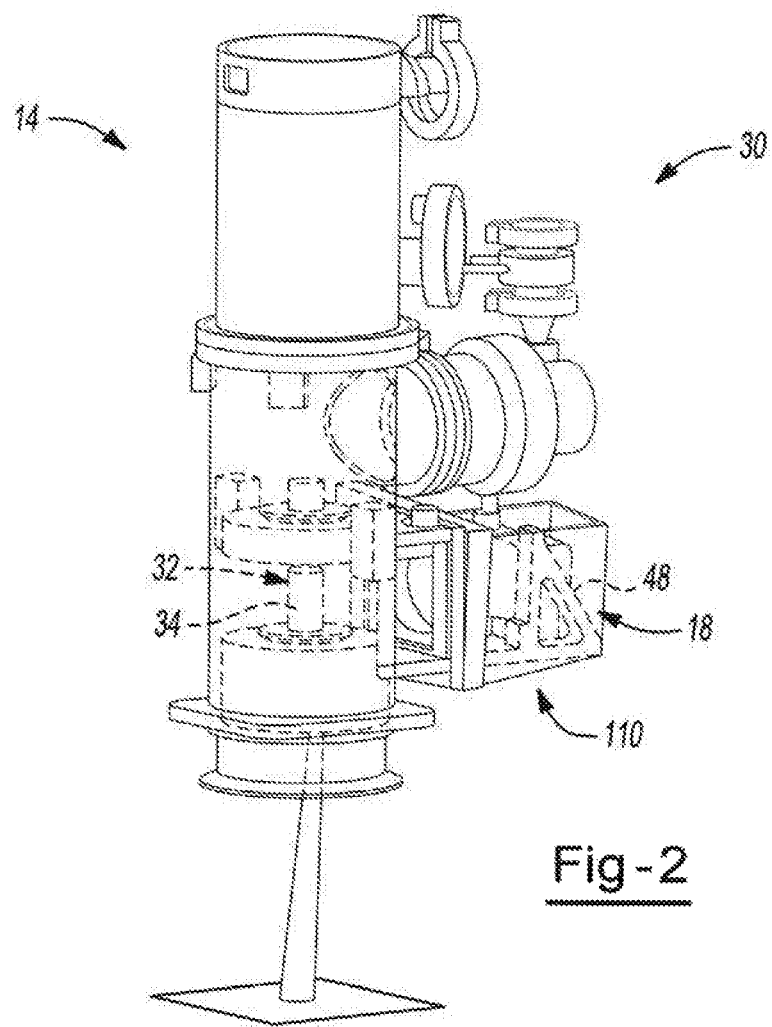
FIG. 2 is a perspective view of an illustrative energy emission device and monitor assembly of the present teachings.
Figure 3A:
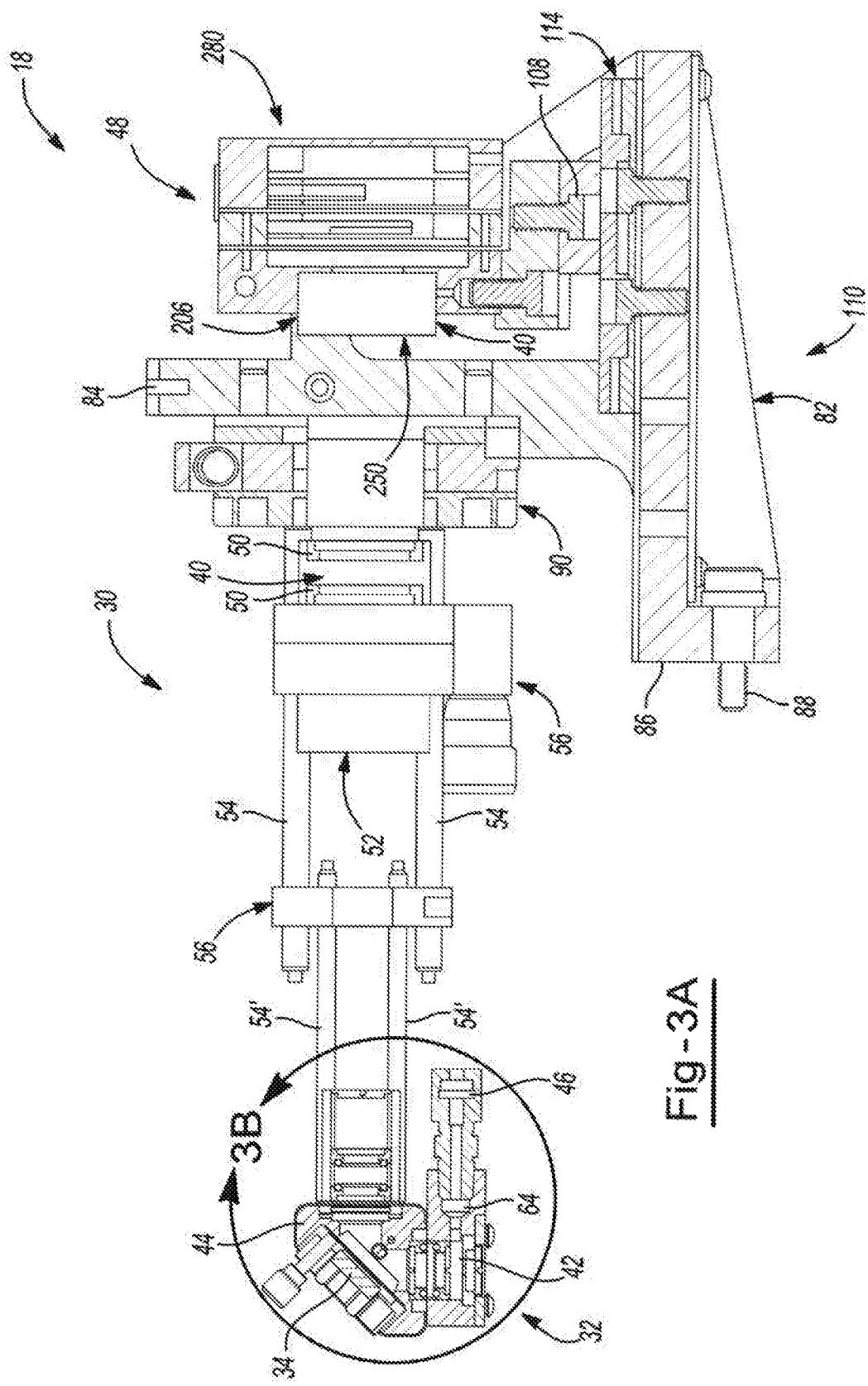
FIG. 3A illustrates a side view of an illustrative device for monitoring a molten pool deposit.
Figure 3B:
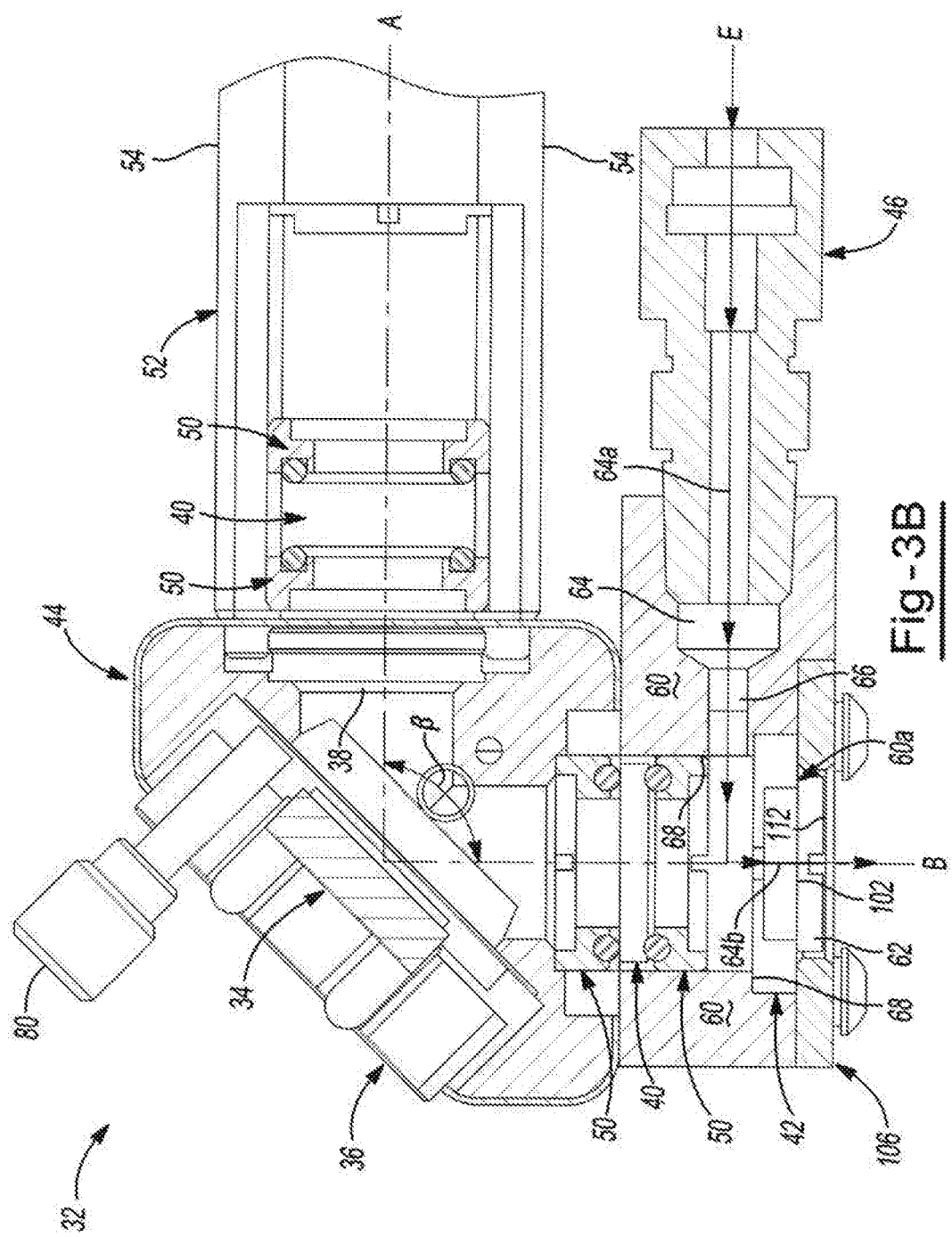
FIG. 3B illustrates an enlarged view of components of a vapor protection device shown in FIG. 3A.

With reference to FIGS. 2-3B, the LM apparatus 10 may include one or more monitoring system 30 that may include a detector 18, (e.g. an optical detector or more preferably a camera such as a digital camera), for monitoring a preselected condition. Preferably, for monitoring a preselected condition of deposited materials. More particularly, for monitoring a molten pool of the deposited materials. The monitoring system 30 or its components (e.g., detector 18) may be located at least partially within the chamber 22. With reference to FIGS. 3A-3B, an embodiment of the monitoring system 30 is shown having a detector 18 with a detector housing 48 (which may be temperature controlled), and an optional vapor protector 32.

The detector 18 may include one or more sensors or other devices (e.g., one that derives its measurements optically, mechanically, by infrared imagery, by some other radiation detection, or otherwise). The detector may be a solid state device such as one that comprises one or more sensors (e.g., a solid state array effectively including a plurality of sensing pixels) that convert a detected condition into an electrical signal.

The detector may be used so that it monitors a condition associated with a molten pool deposit. The detector may monitor bulk average temperature of the molten pool deposit, temperature gradient within the molten pool deposit, surface topography of the molten pool deposit, the presence of any liquid-solid interface in the molten pool deposit, surface profile of the molten pool deposit, chemical analysis of the molten pool deposit, or any combination thereof. For example, the detector 18 may be configured to measure the melt-pool energy of the molten pool, which may be determined by measuring the melt-pool size and temperature using an optical technique (e.g., by use of a suitable imaging device such as a camera). A preferred detector may employ suitable hardware adapted for machine vision applications, and thus may include one or more housing (e.g., temperature regulated housings). The housing may contain a suitable substrate that includes an array of pixels, and optionally one or more lenses and/or shutters for controlling optical communication between the pixel array and the object being monitored (e.g., a molten pool of a work piece).

The detector 18 may include a camera selected from a high speed video camera, standard video cameras, thermal imaging cameras, still imaging cameras, or any combination thereof. The detector 18 optionally may include one or more of the following, an accelerometer, a thermocouple, a pressure sensor, a current sensor, a voltage sensor, a deflection coil sensor, a focusing coil sensor, a rate sensor, a location sensor, a wire feed subsystem sensor, or a combination thereof. An example of a suitable detector 18 may be a camera (e.g., a high speed camera) with an image sensor that includes one or more of the following features: an array of active pixels (e.g., a complementary metal oxide semiconductor (CMOS) image sensor array, a charge coupled device (CCD) image sensor array, or both); progressive scan; resolution that is at least about 640×480; preferably at least about 752×582; and more preferably at least about 1024× 1024 pixels. Examples of art-disclosed CMOS imaging systems are found in U.S. Pat. Nos. 6,815,685; 7,107,118; and 7,380,697, all of which are incorporated by reference herein. The detector may display results monochromatically, in color, or both. The detector may be configured so that it operates at an image acquisition rate or frame rate that ranges from about on the order of at least about 25 frames per second, e.g., about 30 frame per second (fps) or higher. It may operate at least at about 40 fps, at least at about 50 fps, or even at about 60 fps, or more. For example, it may operate at about 25 to about 500 fps (e.g., about 30 to about 60 images per second, about 150 fps, or faster). Suitable sensor arrays for detectors may have a pixel size of about 9×9 µm$^2$ to about 12×12 µm$^2$ (e.g., about 10.6×10.6 µm$^2$).

Suitable cameras may include a CMOS active pixel image sensor, CCD image sensor, or both, preferably housed together with suitable optics and associated electronics. Examples of preferred cameras are available from Photon Focus of Switzerland (e.g., sold under model number MV-D1024E-40-CL-12, MV-D752-28-CL-10, or MV-D1024E-160). An example of a preferred camera may include a dynamic range with a relatively high contrast resolution (e.g. at least about 80 dB, 120 dB, 140 dB, or more), and a shutter and/or an electronic shutter (e.g. a shutter that controls exposure time electronically (i.e., allows the camera to collect light for a finite amount of time) without any mechanical or moving parts) that may be used for high speed applications with an exposure time of about 5 to about 1000 µs (e.g., about 10 µs). A camera may employ a suitable imaging array as is employed conventionally for monitoring welding conditions. The camera may have a skimming feature. The imaging sensor may operate over a spectral range of about 200 to about 1200 nm (e.g. about 350-1000 nm).

Figure 3C:
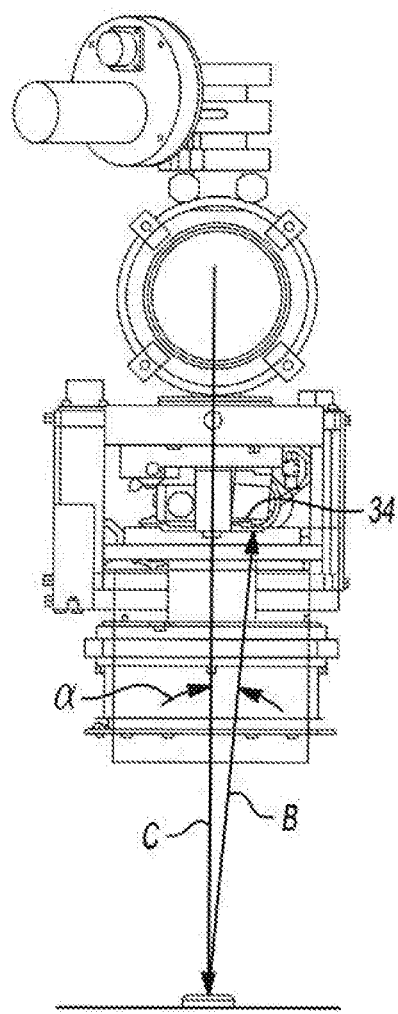
FIGS. 3C-3D illustrate an example of light beam orientation.
Figure 3D:
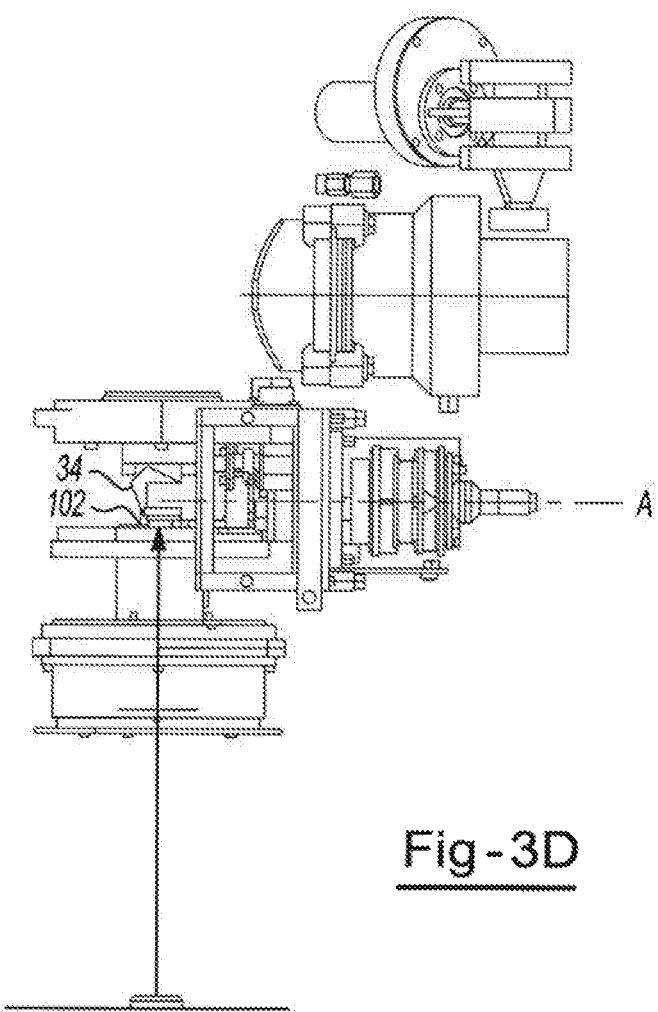

With reference to FIG. 3D, one possible approach may be to employ a monitoring system that includes a detector with intermediate optics that allow images to be captured substantially overhead of the melt pool deposits. For example, the detector may face a reflective substrate 34 (e.g., a mirror or other suitable member that reflects an image) that may be positioned between the detector and the object to be imaged (e.g. a weld pool). The reflective substrate may be positioned so that the detector has a line of focus (A) (e.g. a path from the detector to the reflective substrate) that may be approaching generally perpendicular to the electron beam, and the reflective substrate may have a line of focus (B) (e.g., from a pinhole of a purge block to the imaged structure) that is positioned generally in alignment with the path of the electron beam.

Figure 4A:
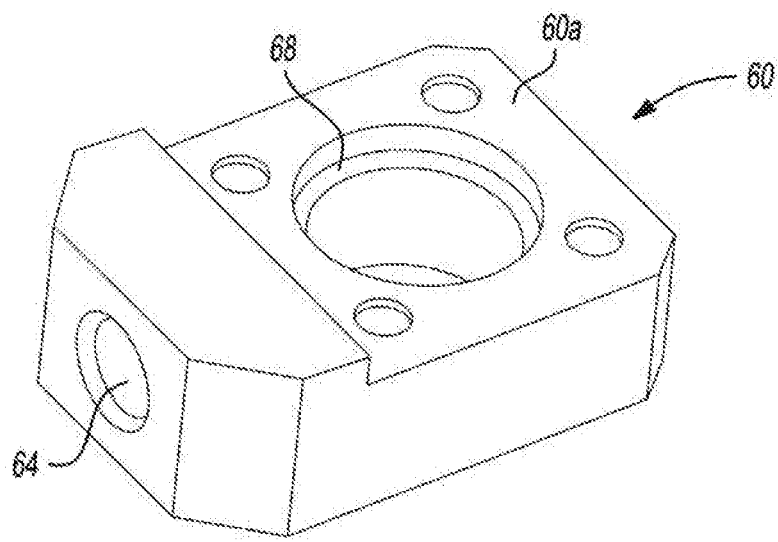
FIG. 4A illustrates an example of a purge block structure for a vapor protection device.
Figure 4B:
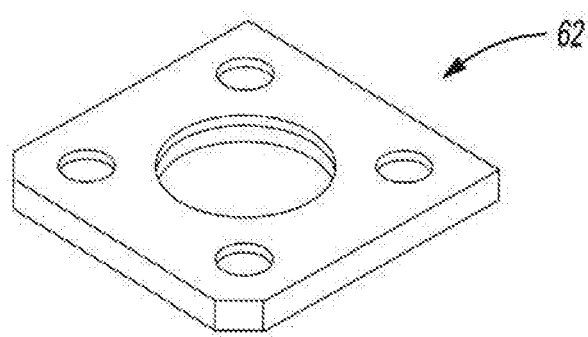
FIG. 4B illustrates an example of a component of a vapor protection device herein.

FIGS. 3C-3D, provide one specific, but not limiting, example of the light beam orientation relative to the energy beam. The energy beam being directed from the energy emission device 14 extends along axis (C), which may be generally perpendicular (e.g., about 90°) relative to the work piece support 16. The positioning mechanism of the monitoring system 30 may position the vapor protection device 32 so that the light beam may be received by the vapor protection device extends along axis (A), which may be at an angle (α) of from about 0.05° to about 200 (e.g., about 2° to about 10° and more preferably about 6°) from axis (C) (FIG. 3C). Thus, the angle (α) may be about 20° or lessor even about 100 or less. In one preferred embodiment, the light beam generally deflects at about a 90° angle from being received by the reflective substrate 34 to being deflected to the detector 18 (FIG. 4B).

The detector may be used in any step of monitoring, which may include capturing an electronically stored image substantially in real time (e.g., it is less than 5, 4, 3, 2, 1 or, lower, seconds from the time of the event recorded). The sensing device may detect electromagnetic radiation emitted from interaction of the electron beam with a material in the work piece (it being recognized that the work piece will include any present molten deposit) to be imaged.

Figure 5:
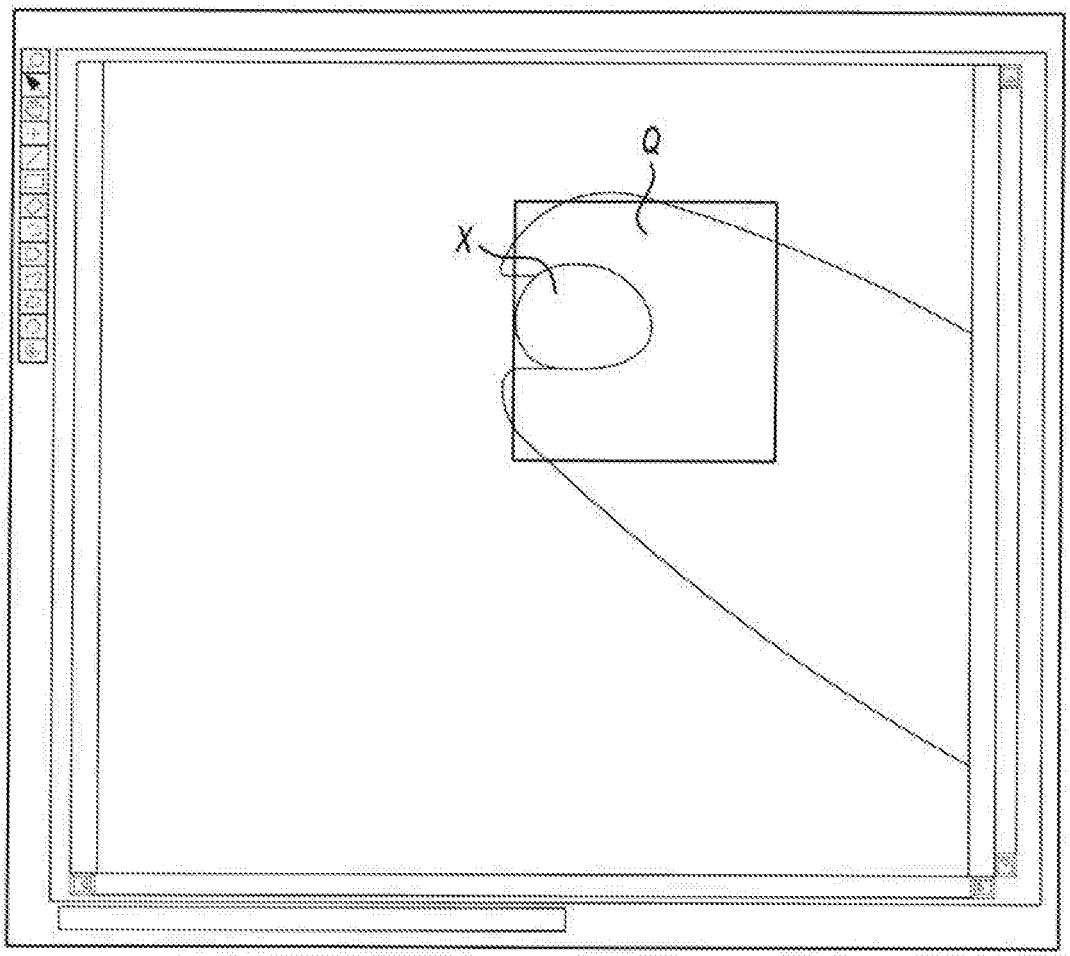
FIG. 5 is an example of an image obtainable using the present teachings.

Detection according to the present teachings may be for purposes of directly obtaining a measurement that is indicative of a condition of a pool deposit. It is possible that a detection technique may be employed that indirectly measures a condition of a pool deposit by observing a detectable characteristic, and then correlating the detected characteristic with an indication of a particular condition. To illustrate, under this approach, oscillation frequency of a pool deposit may be monitored, and may be correlated with a depth of a deposition pool, it being theorized that a higher detected frequency may indicate less penetration of a molten pool deposit into a previous deposition layer. FIG. 5 is an example of a molten pool image that may be achieved using the detector. The wire feed in these images is entering from the left side. As is seen, overall the shape is generally round and generally axially symmetrical. It includes a generally C-shaped portion (Q) with a generally circular or elliptical shaped portion (X) (which may correspond to an image of the feed material) that is within the C-shaped portion, and possibly extending outside the opening of the C-shaped portion. The process herein contemplates that adjustments may be automatically made to the system so that a predetermined shape for the image is obtained, a generally axial symmetry is achieved, or both.

The LM apparatus 10 may include a housing that defines a chamber 22 wherein the work piece may be formed. The housing preferably may form a sealed chamber capable of maintaining an evacuated environment. The major components of the LM apparatus 10 may be contained within the sealed housing (e.g., the material delivery device 12, the energy emission device 14, the work piece support 16, and the detector 18).

In one embodiment, the housing may include a frame and at least one wall formed of a material. The wall may be made of ceramic, a ceramic composite, a metal matrix composite, a polymer matrix composite, or a combination thereof. In another embodiment, the frame and at least one wall may be made of titanium, aluminum, aluminum alloys, beryllium alloys, stainless steel, steel, or a combination thereof, which may provide for radiation protection and structural integrity. The housing may further include at least one window for operator visibility as well as monitoring by cameras or a video system. It should be recognized that, even though the present invention obviates human operator intervention, the processes and apparatus here may be practiced with some human operator intervention; however, any such intervention may be considerably less than prior systems, and may be aided by real time data acquisition from the monitoring system.

The at least one window may be formed of a transparent material such as leaded glass, glass, transparent plastic, or any combination thereof. The housing may include at least one door attached to the frame or wall to allow full access to the chamber's interior, when not under vacuum. The sealed housing includes at least one electrical and/or data cord feed-through (not shown) for connecting the material delivery device 12; the energy emission device 14; the monitoring system 30 (e.g., detector 18); motors for positioning mechanisms (e.g., for the material delivery device, energy emission device, monitoring system 30, the work piece support, or otherwise); or any combination thereof, with a power source and/or instrumentation (e.g. computer system) located outside the housing.

As seen in FIG. 1A, the housing may be a generally larger rectilinear cross-sectional shape. However, other shapes and sizes are possible. In one embodiment, the sealed chamber may be generally small so that the housing may be portable. As discussed above, the housing provides a sealed chamber that may be evacuated using a vacuum mechanism (not shown) to reduce the pressure of the chamber below atmospheric pressure. For example, a pump, blower, some other fluid mover, or a combination thereof may be used to reduce the pressure within the chamber. The pressure within the chamber may range from about $1 \times 10^{-1}$ to about $1 \times 10^{-7}$ torr (or possibly lower). Furthermore, the pressure within the chamber may be less than about 0.1 torr, preferably less than about $1 \times 10^{-2}$ torr, and more preferably less than about $1 \times 10^{-4}$ torr.

The effectiveness of the above described detectors and monitoring steps may be dependent upon assuring a clear line of sight between the sensing elements of the detector and the object being measured (or any intermediate optical elements, such as mirrors (e.g., one or more mirrors that may be used for beam modulation)). However, the process and/or apparatus may generate raw material vapor that may be susceptible to deposition onto hardware associated with the detector. For example, vapor may deposit upon a lens of the system, and/or upon another optical element (e.g. a mirror). Accordingly, with reference to FIGS. 3A and 3B, the apparatus may include a suitable vapor protection device 32, which functions to impose a protective barrier (e.g., a solid barrier, a fluid barrier, or both) forward of one or more of the vulnerable exposed components. Preferably, the vapor protection device 32 will be such that it resists vapor disposition build-up onto the exposed componentry so that the vapor does not build up and adversely affect measurement integrity. The vapor protector device may include one or any combination of a relatively low surface energy coating (which may be substantially transparent to the radiation being detected) that delays vapor deposition build-up onto a surface as compared with a surface without the coating; a solid physical barrier (e.g., a shutter, a curtain, or other barrier that can be opened and closed to expose the componentry as desired); a fluidic barrier (e.g., a gas stream that can be controllably flowed to expose the componentry as desired); or a combination thereof.

A vapor protector device may be located substantially adjacent to a barrier with an aperture that may have an optical element located behind the wall (e.g., a beam modulation aperture). A vapor protection device 32 may be positioned substantially adjacent with the detector 18 (e.g., proximate to the lens of a camera), remote from the detector 18 (e.g., proximate to a reflective substrate 34 as in FIG. 3B, but laterally spaced apart from it), or both. In a preferred embodiment, as shown in FIGS. 3A-3B, the barrier with an aperture 42 may be located juxtaposed the second opening 38 of the housing 44. The protective device 32 may include a protective means, for reducing or eliminating vapor buildup, such as a purge system. The purge system may include a purge line (not shown) attached to a fitting 46, and a port so that the fitting and purge line may be connected to the vapor protection device for delivering a fluid into the housing 44. The fitting 46 may be a compression fitting and may attach to a tube or a pipe. As discussed herein, the fitting 46 may be positioned proximate to the barrier with an aperture 42 so that a fluid stream may enter through an intake port 64a and may be directed towards (e.g., laterally) the opening of the barrier 42 in the direction (E) (as indicated in FIG. 3B). The gas stream may exit through an exhaust port 64b.

The vapor protector device 32 may be operated in an intermittent manner, allowing periodic direct line-of-sight exposure (via one or more pin-hole aperture 102, of the detector to the object being sensed. The fluid may be generally optically transparent, thereby allowing an image to be received through the aperture. For example, periodic bursts of a fluid (e.g., a substantially inert gas such as helium) may be blown to effectively blanket the pinhole aperture 102. In this manner, it may be possible to clear vapor away from exposed componentry. The vapor protector device 32, preferably, may be operated in a continuous manner. For example, one or more pumps (i.e. a vacuum pump) may be used to create a periodic and/or continuous flow of the fluid that exits through the pinhole aperture 102, and may generate a positive pressure inside of the vapor protector device 32. The one or more pumps may be operated so that the pumps are not overwhelmed while still maintaining the flow of the fluid at a constant rate and pressure such that the vapor particles are prevented from building up on the internal surfaces of the vapor protector device. The pumps may be controlled by the closed loop control system that operates the various components herein or independent of such system.

The monitoring system may include a barrier with an aperture 42 (e.g., what is regarded herein as a pin-hole aperture 102). For example, the pin-hole aperture may be an aperture having a diameter or width (e.g., circular, oval, slit, or otherwise) of about 0.50 mm or greater, of about 2.0 mm or greater, of about 3.0 mm or greater, or even about 5.0 mm or greater) and any associated optics. Other components of the vapor protection device may also include a pin-hole aperture, which may be axially aligned with the pin-hole aperture of the barrier 42 along axis (B). The barrier with an aperture 42 may be, for example, an optical aperture, a standard aperture, or both for controlling the diameter of a beam from a light source (e.g., for modulating the beam by limiting the light admitted therethrough), producing optimal diffraction patterns, or both, preferably during the course of detecting by the detector 18. For example, a barrier with an aperture of a various size (e.g., adjustable) or a constant size, where size (e.g., diameter) may be determined from the equation:

$$D^2=(K\lambda ab)/(a+b); \text{ where:}$$

D=Diameter of the opening (e.g., pin hole) (e.g., about 0.076 mm)
K=Constant between 1 and 4 (e.g., about 3.24)
$\lambda$=Wavelength of the light (e.g., about 660 nm)
a=Distance from the subject (e.g., work piece such as the molten pool deposit) to the opening (e.g., about 330 mm)
b=Distance from the opening to the image plane (e.g., deflector such as the mirror) (e.g., about 12.7 mm)

With reference to FIG. 3A-3B, the vapor protection device 32 may include a block that includes a base portion 60 and cover portion 62 (particularly a pin hole retainer member (such as illustrated in FIG. 4B)) that may be attached to an outer surface of the base portion. The base portion may include at least one port 64 (e.g., penetrating from a side wall, or for receiving a gas stream that may be controllably regulated). The port 64 may be in communication with a passage 66 which may be configured for receiving the barrier member with an aperture 42. The passage may be recessed so that the barrier member with the aperture 42 may be generally maintained in place once the cover portion 62 is secured to the base portion (e.g., the barrier member is fixed between the cover and the base portions, as can be seen in FIG. 3B). The passage 66 may include an opening (e.g., hole) so that gas received by the port 64 may be directed through the passage, and may contact the barrier with an aperture 42 and more specifically the pin hole aperture 102. Optionally, as can be seen in FIGS. 4A-4B the cover portion, the base portion, or both may include one or more shoulder 68 upon which the barrier with an aperture may be rested, and the cover 62 may be attached onto a surface 60a. The cover and barrier with an aperture may be held in place by a pin-hole retainer 106. The pin-hole retainer 106 may include one or more retaining ring 112. The vapor protection device 32 may be further configured as a mounting structure for the barrier with an aperture 42 relative to the other components of the apparatus. The base portion 60 may be designed to provide a complementary fit with the barrier with an aperture 42. The base portion 60 may act as a protective structure directing the exhausted gas from the port 64 to adjacent components (e.g., mirror, windows, camera lens, or otherwise).

One or more suitable conduits may be employed for supplying the fluid. The one or more suitable conduits may be housed separate or independent from the components of the detector. For example, the one or more suitable conduits may be independent of (e.g., not attached directly) the detector housing (e.g., a camera housing). Rather, the vapor protection device and the housing (though possibly carried by a common structure) may not be commonly enclosed with each other. Thus, the vapor protection device may be longitudinally separated from the detector housing (e.g., camera housing), and one or more suitable conduits may be connected directly to the vapor protection device but not the housing.

As discussed, the monitoring system may include a suitable structure that allows the sensing device of the detector to be oriented away from the direct line of sight with an object being monitored, but which still captures an image substantially overhead of the melt pool deposit. In this case, it may be possible to employ a reflective substrate 34 such as a mirror (e.g., flat, concave, or convex), more particularly a silver mirror available from Edmund Optics. The reflective substrate 34 may be configured to deflect light according to an indirect path from the work piece (e.g., molten pool or otherwise) to the detector. The vapor protection device 32 may further include a reflective substrate adjustment knob 80 (e.g. a threaded device that connects adjoining pieces and is translatable to adjust/position the adjoining pieces relative to each other) so that the reflective substrate may be kept in the direct line of sight with the object being monitored. The reflective substrate is substantially resistant to image distortion when subjected to operating conditions of the system. For example, the reflective substrate may exhibit a relatively low thermal expansion, e.g., within about $+/-0.10\times10^{-6}$ per ° C.

The reflective substrate 34 may be mounted in a housing 44. The housing may create a line of sight to the reflective substrate. The line of sight may be an angle ($\beta$) (See FIG. 3B) between about 0 and about 180 degrees, more particularly between about 30 and about 150 degrees, and even more particularly between about 60 and about 120 degrees (e.g., about 90 degrees).

The housing 44 (e.g., a 16 mm, right angle, kinematic mount) may be a generally sealed unit so that contamination and/or vapor deposition buildup may be substantially reduced or eliminated. In one embodiment, the reflective substrate 34 may be generally sealed within a housing 44 having at least two openings with a first opening 36 for receiving the beam of light from a predetermined location (e.g., the work piece, the work piece support, or otherwise) and a second opening 38 for reflecting the beam of light to the detector 18. The first opening 36 and second opening 38 may include a generally transparent substrate 40 or otherwise for allowing the light beam to be directed through the housing 44 while generally maintaining a sealed environment. More particularly, the generally transparent substrate 40 may be a glass window (e.g. a glass window or a borofloat glass optical window) or a lens (e.g. an Esco Doublet #A912150). The transparent substrate may be a component of the detector or may be separate therefrom. The transparent substrate may be held in place by one or more retaining ring 50. In one preferred embodiment, the transparent substrate 40 may include a resistant material (e.g., coating) that substantially prevents or eliminates vapor disposition buildup. The resistant material may exhibit one or more of the following characteristics: a low coefficient of expansion, visibility to near infrared transmissions, a high resistance to thermal shock, chemical resistance, an anti-reflection, or any combination thereof. The resistant material may include borosilicate.

As will be described in further detail, the detector 18 or any of its sensing devices may be partially or completely encased in a detector housing 48, which may be thermally regulated so that the temperature of the detector or its components may be controlled (e.g., for cooling its electronic components). As seen in FIGS. 2 and 3A, there may be a suitable support member 108 (e.g., a flange) for supporting the housing 48 relative to the support base 82. The monitoring system 30 may be attached to the housing of the energy emission device using an attachment structure 110 (e.g., a flange). For example, as depicted there is a support base 82 from which a mount wall 84 projects away (e.g., upward). The support base 82 and the mount wall 84 may be substantially perpendicular to each other. At one end of the attachment structure, such as at an end 86 of the support wall there may be a mechanism 88 (e.g., a fastener) for removable attachment. Attached to the mounting wall 84 may be one or more rotational mounts 90. The support base 82 may include one or more adjustment mechanism 114 that allow axial translation. For example, the support base may include two opposing members that are slidable relative to each other, but provide opposing support surfaces. An example may include a dovetail adjustment structure as seen in FIG. 3A. The support base 82 may be attached to a common carrier with the energy emission device. The monitoring system 30 may be secured to the energy emission device 14 so that at least a portion of the monitoring system 30 (e.g., the vapor protection device 32) may be positioned within the housing of the energy emission device, or at least substantially adjacent to the part of any emitted beam.

The monitoring system 30 may further include one or more lens tubes 52 extending between the detector 18 and the vapor detection device 32, as illustrated in FIG. 3A. A lens tube 52 may be configured to isolate the light beam associated with an image from the surroundings. The lens tubes may include one or more transparent substrates 40 (e.g., a lens) that may be held in the lens tube using one or more retaining rings 50. The lens tube may be spaced apart from and is not housed with the reflective substrate of the vapor protection device, as illustrated in FIG. 3A.

The monitoring system 30 may further include one or more support members 54 and 54' (e.g., elongated members such as rail carriers, a cage system, or a cage structure (as illustrated in FIGS. 3A-3B)) to provide connecting support for the detector 18, the lens tube 52, the vapor protection device 32, or any combination thereof. It is possible that the cage system created by the one or more support members 54 will have no overlying housing. Thus, the vapor protective device and the camera may be separated by an open cage structure. A plurality of elongated support members 54 and 54' may be telescopically connected to each other for allowing lateral translation and adjustment. The support members 54 may be configured so that they allow the detector 18 to receive an image from the reflective substrate 34, while protecting the monitoring system 30. The support members 54 may allow for a generally linear path through the lens tube 52 to the reflective substrate 34. The monitoring system may include an adjustment mechanism 56 (e.g. an axially translatable mechanism) to adjust the position of components of the optical system (e.g., the vapor protection device 32 (e.g., linearly towards or away from the detector 18)). The support members 54 may further be configured to provide axial adjustments. In this manner, a fluid line may be maintained separately from the detector (and particularly a temperature controlled housing) and can be manipulated without disturbing the detector. Though the vapor protection device and the cooled camera housing may be carried on a common support structure, the vapor protection device may be decoupled from the cooled camera housing.

Optionally, it is appreciated that the LM apparatus 10 may further include one or more cooling mechanisms such as a heat sink to absorb and dissipate heat in regions where heat build-up is expected. For example, the detector 18 may further include a water cooled housing (e.g., within the camera housing) with a direct chip level heat sink to generally maintain the detector within normal operating conditions.

In general, such a cooled camera housing may include a housing that surrounds electronic components (e.g., at least one printed circuit board) associated with the detector (e.g., electronic components of a camera). The housing preferably includes a passage defined in at least one wall through which a heat exchange medium (e.g., a suitable liquid coolant) is flowed. Desirably, the heat exchange medium is passed through a wall at a location between any beam from the energy emission device (e.g., an electron beam from an electron beam gun) and the electronic components). By way of example, the cooled housing may include a plurality of stacked flanges, at least one of which has a passage at least partially laterally defined therein through which the heat exchange medium is flowed. As illustrated, some or all of the flanges may define a generally ring shaped peripheral portion that surrounds at least one through hole that defines a cavity. The flanges may be configured to include one or more support surfaces, brackets, or other structures to which a component (e.g., an electronic component) may be mounted or otherwise supported. The flanges may adjoin each other and be separated by a relatively resilient but thermally conductive layer, and particularly a polymeric (e.g., acrylic based) spacer pad.

An example of a cooled housing may include a plurality of flanges, and more preferably at least three axially aligned flanges that may be separated by spacers. At least one cavity may be defined within the assembled flanges, within which at least one electronic component is housed, such as one or more printed circuit boards. An image detector (such as an array of pixel sensors may also be contained therein, and be in at least temporary visual communication with an object to be imaged. At least one flange (e.g., a front flange) may include an inlet and an outlet so that a fluid may be circulated through the front flange (e.g., at least across the length or width of the flange). The front flange may further include a mount adapter (which may be located in a central region of the front flange) that enables mounting of the associated hardware to the housing. The flanges may be assembled together and connected such as by way of a plurality of suitable fasteners. Two or more of the internal components may be connected to each other in signaling communication. The rear flange may include suitable structure configured to afford connection of powered components with a suitable energy source, or through which cables or other signal lines may be passed. The housing may have a generally rectangular cross sectional outer profile along the longitudinal direction of the housing, other shapes are also possible. The housing may be longitudinally spaced apart from the vapor protection device described herein, and may not share a common enclosure with the vapor protection device. Thus, any pinhole aperture for resisting vapor buildup and associated with mirror or other reflective optics may be housed in a separate enclosure. The housing may be free of any line or other conduit for supplying a gas to the vapor protection device; thus, the housing may be free of any fluid (e.g., gas) that passes through it for resisting vapor build-up.

Figure 6A:
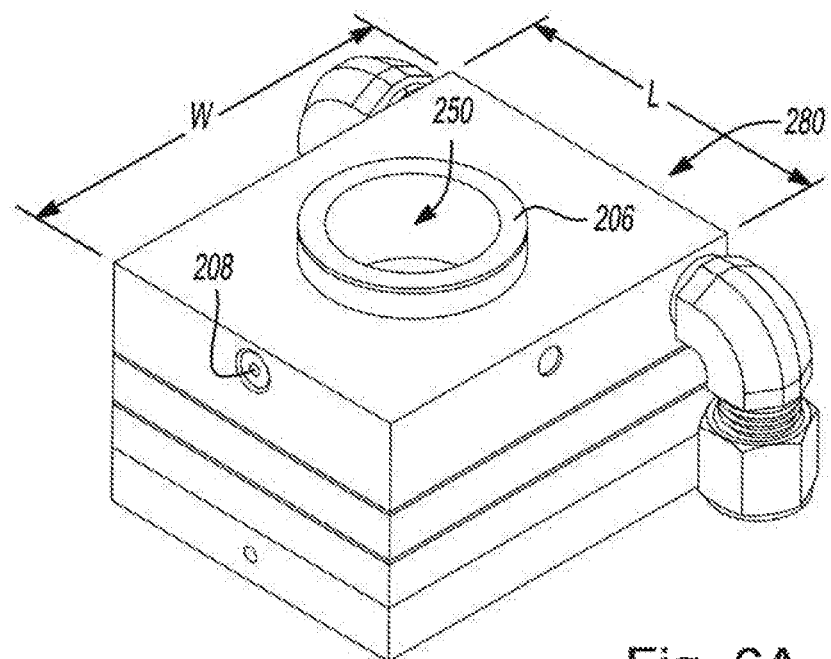
FIGS. 6A-6B illustrate views of an example of temperature controlled housing.
Figure 6B:
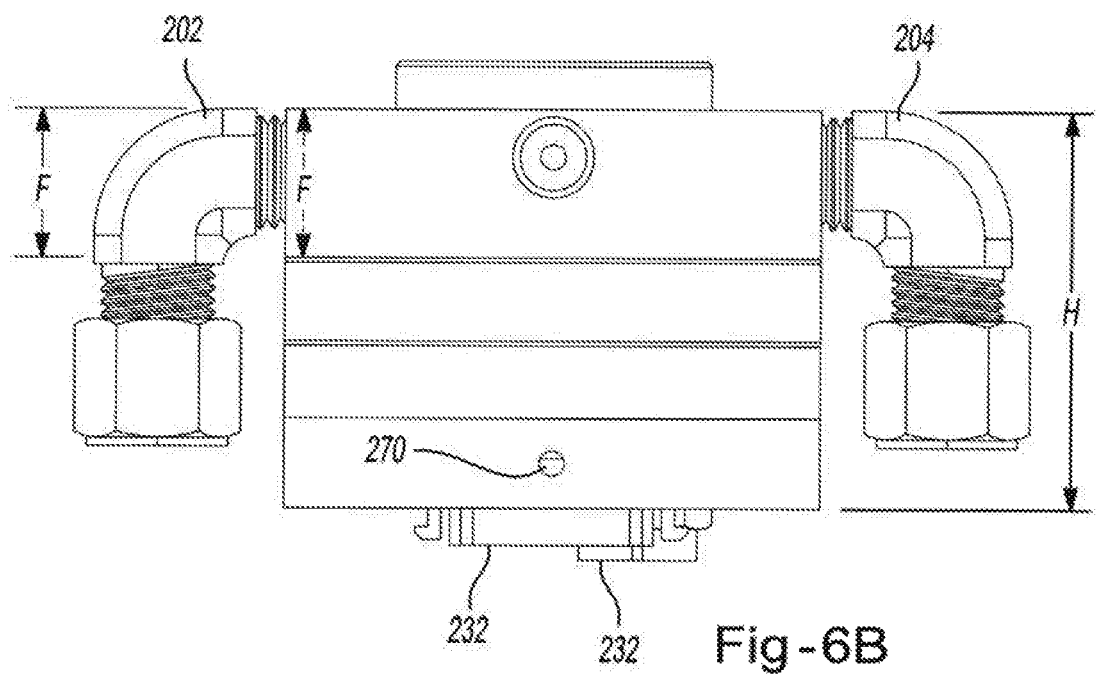
Figure 6C:
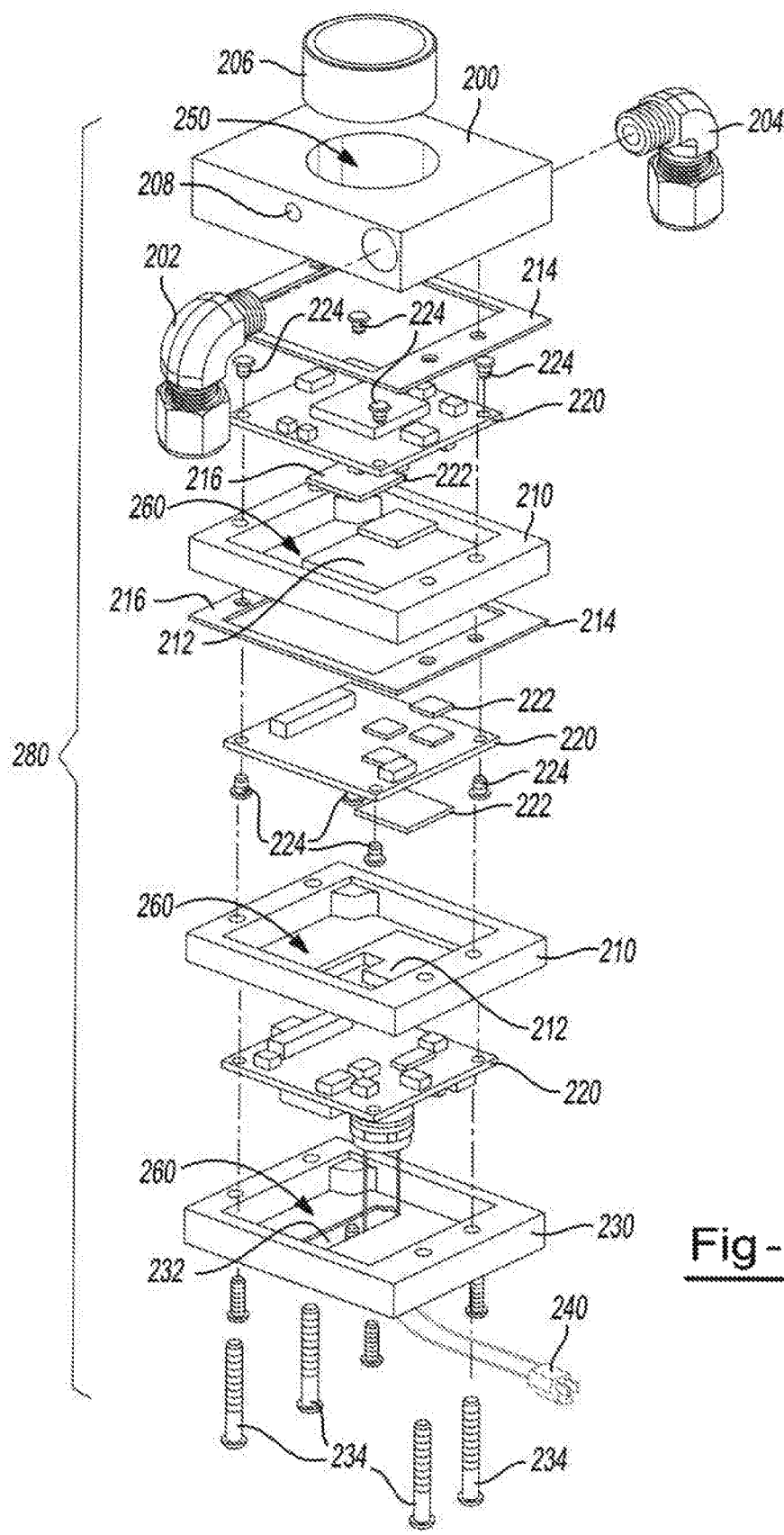
FIG. 6C is an exploded perspective view of a temperature controlled housing.

FIGS. 6A-6C illustrates an example of a cooled housing 280 that includes a front flange 200 (shown with a lens opening and an adapter) having a plurality of spacers 210 connected to the front flange 200. A plurality of seals 214 (e.g. polymeric interface seals) may be located in-between the spacers, in-between the front flange and a spacer, in-between the rear flange and a spacer, or any combination thereof. A rear flange 230 may be connected to the plurality of spacers and/or seals and located toward a remote end of the camera housing. The front flange, seals, spacer, and back flange form at least one cavity 260 into which at least one electronic component may be contained (e.g., a plurality of printed circuit boards 220 may be located within the cavity). The printed circuit boards may include at least one interface pad 222, an energy source 240, an image detector 250 (such as an array of pixel sensors located forward of the pad 222). One or more flanges (e.g. the front flange 200) may include an inlet 202 and an outlet 204 so that a fluid may be circulated through the front flange (e.g., at least across the length or width of the flange). For example, the inlet and the outlet are illustratively depicted as including a substantially perpendicular elbow joint fitting. The front flange may further include a suitable mount adapter 206 (e.g., a C-mount adapter, S-mount adapter, F-mount adapter, or the like (which may be located in a central region of the front flange)) that enables mounting of the associated hardware (not shown) (e.g., a camera lens) to the housing (i.e., front flange). The mount adapter may be secured in or to the front flange using a plurality of pins 208. For instance, one or more pins or other members may penetrate the side walls of the front flange so that the pins or other members can be brought into contact with the mount adapter 206 to resist the adapter from being pulled out. The flanges may be assembled together and connected such as by way of a plurality of suitable fasteners. For example, some or all of the front flange, seals, spacers, and back flange may be connected together by a fastening device 234. The fastening device may be a bolt, screw, pin, rivet, or the like. One or more of the printed circuit boards may be attached to the spacers or seals by a suitable connection device 224 (e.g. a fastener). The rear flange 230 may include one or more connection ports 232 that are configured to connect with a suitable energy source 240, or through which cables or other signal lines may be passed. The front flange 200, spacers 210, rear flange 230, or a combination thereof may include a vent hole 270 (e.g. through a side wall). The housing may be vented by applying a negative pressure to the vent hole 270, the housing may be vented by applying a positive pressure to the vent hole 270, or the housing may be vented without any forced ventilation.

As indicated, the flanges or the spacers may be configured to include one or more surfaces, brackets, or other support structures 212 to which a component (e.g., an electronic component) may be mounted or otherwise supported. For example, a support structure 212 may be configured with a recess, well, window, or other opening into which a component may be inserted (e.g., so that it achieves a friction fit, an interference fit, or both) so that at least a portion of the component is surrounded by the support structure when assembled. The support structure may be cantilevered relative to the surrounding wall, it may have openings therein, it may include a flat surface, or any combination thereof. The spacers and/or seals may further be configured to include one or more heat sinks (216).

The front flange, spacers, seals, and rear flange are generally rectangular in their peripheral shape, though other shapes may be used. Thus, they may have an aspect ratio that is the ratio of the width (W) to the length (L) of the rectangular periphery. For example, the housing may have an aspect ratio of about 2 to 1, preferably about 1.5 to 1, and more preferably about 1.2 to 1. Intermediate flanges may be generally rectangular rings.

The front flange, rear flange, and spacers may be made of an insulating material or a material that conducts heat (i.e. aluminum). The materials desirably will resist degradation throughout the temperature range to which they are exposed. The front flange, rear flange, or spacers may contain an inlet, outlet, or both. The inlet and outlet may be located on opposite sides of the front flange facing each other (FIGS. 6A-6C). They may be provided with suitable fittings for attachment to tubing for circulating a heat exchange medium. Of course, the image detector may include a charge coupled device (CCD) for sensing, a complementary metal oxide semiconductor sensor (CMOS), or some other active pixel sensor. One approach contemplates the selection of materials and configuration for the seals so that the seals function to conduct heat rather than insulate. For example, one or more of the seals may be made of ceramic, glass, acrylic, fiberglass, silicone, metal, or the like.

Either or both of the seals 214 of the interface pads 222 may be thermally conductive and generally resilient. For example, they may be polymeric. The at least one interface pad 222 may function as an interface pad, particularly a thermally conductive interface pad, and more particularly a thermally conductive polymeric interface pad. Some properties that the at least one interface pad 222 may exhibit include having: good softness, conformability to non-flat surfaces, excellent compressive stress relation, high thermal conductivity, good surface tack that leads to a low thermal resistance at its surface, good dielectric performance, and excellent durability for both long term thermal conductivity and electric insulation stability. The at least one interface pad 222 may be a non-silicone acrylic elastomer, and may be flame resistant (e.g., it meets requirements for certification under UL94). For example, the at least one interface pad 222 may include a flammability of about V-0, measured using the UL94 flammability test method.

One or more printed circuit boards may be disposed on a support 212, with an interface pad 222 between them (e.g. the interface pad is compressed between the circuit board and the support). The interface pads 222 maybe interferingly fit into a complementary receptacle in the support structure 212 of one of the flanges. Thus, it is possible to achieve a thermal conduction pad (e.g. a continuous thermal conductive path) within the housing between the electronics and the housing. The interface pads 222 may effectively fill air gaps between the electronic components and their support structures in the housing so that a thermal conduction path of a relatively large area is realized. The interface pads may have a surface that contacts the opposing electronic component over at least 30%, 50%, 75%, or more of the outer opposing face of the component, thus, spreading the area for heat transfer. It is thus possible to see how a compact geometry camera housing can be achieved by which heat transfer primarily by conduction (with or without convective assistance, e.g., a circulated fluid) is realized by the teachings herein, for cooling the internally housed electronic components. Meanwhile convective cooling may be used for cooling the housing that becomes heated by the conducted heat of the housed components. The teachings herein, thus, also contemplate steps of cooling internally housed electronic components by a thermal conduction arrangement (e.g. an arrangement that consists essentially of cooling by thermal conduction) to transfer heat to a housing body, and remove heat from the housing body using a fluid.

The at least one interface pad, the seals, or both may have a density (g/cm$^3$, @25° C.) of about 0.5 or more, more preferably about 1.0 or more, and still more preferably about 1.5 or more. The density may be about 5.0 or less, more preferably about 3.5 or less, and still more preferably about 2.5 or less (i.e. from about 1.9 to about 2.1), measured using the JIS K6249 test method. The at least one interface pad 222 may have a hardness of about 5 or more, more preferably about 10 or more, and still more preferably about 15 or more. The hardness may be about 100 or less, more preferably about 60 or less, and still more preferably about 35 or less (i.e. from about 16 to 30), measured using the Asker C test method. The at least one interface pad 222 may include a volume resistivity ($\zeta$-cm) of about $1.0 \times 10^{12}$ or more, more preferably about $1.5 \times 10^{12}$ or more, still more preferably about $2.0 \times 10^{12}$ or more. The volume resistivity may be about $6.0 \times 10^{12}$ or less, more preferably about $4.5 \times 10^{12}$ or less, still more preferably about. $3.5.0 \times 10^{12}$ or less (i.e. from about $2.7 \times 10^{12}$ to $3.4 \times 10^{12}$), measured using JIS K6249 test method. The at least one interface pad 222 may have a dielectric strength (kV/mm) of about 10 or more, even about 15 or more, and even about 20 or more. The dielectric strength may be about 75 or less, about 50 or less, or about 35 or less (i.e. from about 21 to 33), when measured using JIS K6249 test method. The thermal conductivity may be at least 1 (W/M-K) (e.g. about 2, 3, 4, or even higher), measured using ASTM E1225-04. The thickness of the material may range from about 0.5 to about 1.5 mm. Smaller or larger thicknesses are possible also.

The at least one interface pad 222, the seals 214, or both may include one or a plurality of layers. For example, it may include a surface layer and a core layer. It may also include a liner (e.g., a film liner). The layers may be polymeric. They may differ in terms of rigidity. For example, the surface layer may be more rigid than that core layer, or vice versa. They may differ chemically. They may be a thermally conductive elastomeric material. They may be an acrylic material. An example of a material that may be used for the at least one interface pad is Thermally Conductive Acrylic Interface Pad, available from 3M under the designations 5589H and 5590H.

When the housing is assembled together it will have a height (H) that spans from a forward face of the forward flange to a rearward surface of the rearward flange. The ratio of the height (H) to the width (W) and to the length (L) may range from about 1:2:2 to about 1:1:1 (i.e. about 1:1.2:1.3). Preferably, the front flange 200 will have the largest height when compared with the spacers and the rear flange. The ratio of the height of the front flange (F) to the overall height (H) of the housing when assembled together may range from about 1 to 1.5 to about 1 to 4 (i.e., about 1 to 2.5).

As discussed the image detector 250 may be any type of device for imaging the inside of a chamber (i.e. infrared video camera, television camera, CCD, or the like). As discussed, one preferred detector uses a CMOS array. It is further contemplated that the housing may be free of air circulation. However, air may be circulated through the housing, the circulated air may be conditioned, or the circulated air may be an inert gas. The camera may be placed in the housing so that the camera is cooled; preferably the housing may be a part of the camera so that the housing protects and cools the components.

The teachings herein also contemplate the possible use of a Faraday cup or other metal cup that catches charged particles in an evacuated condition, and computer tomography software that analyzes power distribution therefrom. An example of such a device employs technology from Lawrence Livermore National Laboratory and is available from Sciaky, Inc., under the designation EBEAM 20/20 Profiler. A grounded heat sink may include a Faraday cup or the like, in an insulated chamber. The heat sink may have an opening in its top that has a tungsten slit disk with radial slits (e.g., about 17 slits) disposed above a copper slit disk with radial slits (e.g., about 17 slits). A graphite slit stop may be within the cup, above a copper beam trap and a graphite beam stop. Such device may be employed in a method that includes steps of (1) quantifying power density distribution, (2) determining the sharpness of focus of an electron beam, and/or (3) correlating machine settings with beam properties.

The LM apparatus 10 further may include a closed loop electronic control device 300 (FIG. 1A) for controlling operation of one or more components of the LM apparatus 10 in response to a condition detected by the detector 18. In one embodiment, one or more of the controls (e.g., closed loop control device 300) and data acquisition may be electronically managed through a user interface and display device (e.g., suitable instrumentation, such as one or more computers). The closed loop electronic control device may operate to perform one or any combination of functions. Most generally, the closed loop electronic control device may acquire one or more signals obtained by the detector 18 (e.g., in real time, as the detector or any sensing device is monitoring the work piece). The closed loop electronic control device may process the signal by comparing it with a stored value (e.g., a value that is programmed into a database, a value from a previous reading, or both). Based upon the step of comparing, the closed loop electronic control device may issue a command that may cause the processing parameters to be changed to one or more different processing parameters (e.g., the closed loop electronic control includes a processor that is programmed to perform the comparison and then issue a certain signal based upon the results of the comparison). For example, the closed loop electronic control device may issue signals to one or more of the following: the material delivery device, the energy emission device, the work piece support, the detector, an electrical supply, a vacuum device, a gas supply, or the vapor protector. The command from the closed loop electronic control device may cause the alteration of one or more conditions, as have been described previously. The conditions that may be altered may be one or more of the following: the location of any device for supplying energy to melt the raw material; the location of any device used for feeding the raw material; the location of any platform upon which a work piece is built; the pressure of any environment in which the processing is performed; the temperature of any environment in which the processing is performed; the voltage supplied to melt the raw material; the beam used for any electron beam source of energy for melting the raw material; the feed rate of the raw material, the composition of the deposited material; changing the temperature of the work piece; the temperature of the platform; or any combination thereof. Examples of suitable software that may be used for the programming of devices used in the present invention include software available from National Instruments (Austin, Tex.) under the designation NI Developer Suite (including LabVIEW PDS, LabWindows/CVI, Measurement Studio, SignalExpress, LabVIEW and LabWindows, and optionally Image Acquisition) and Machine Vision Option for NI DevSuite (includes Vision Development Module, Vision Builder for Automated Inspection, and Vision Builder for AI Development Kit).

The control device may include machine control and process control functions. An example of a suitable commercially available control system is available from Sciaky Inc., under the designation W20XX. The control system may include a suitable computer control and interface (which may include one or more micro-computers, servo drive modules, input/output modules, or signal conditioning module). The control system may include one or more suitable processors (e.g., a processor with at least one VME or other standard bus back plane), such as the 680X0 series of processors (e.g., 68040) from Motorola, with the processors including on-board memory (e.g., Random Access Memory (RAM)). More preferably, an Intel® Pentium® processor may be used. The control system may include a user interface component (e.g., suitable input/output hardware that communicates with the processor and allows programming of the processor, such as by a Microsoft Windows™ operating systems, or otherwise). The control system may include suitable software (e.g., software available under the designation Sciaky Weld 20XX (e.g. W2000, W2010, W2020) or some other W20 family of software).

The W20XX control system may be in signaling communication with one or more suitable computer (e.g., T7400 Workstation PC, by Dell) that may be used to perform closed loop parameter adjustments sent to operate the overall system (e.g., a power supply (which may include a solid state power supply), an electron beam gun, any detector or sensing device, any data acquisition electronics, or otherwise)). The control system may be in signaling communication with hardware, such as an energy emission device, a monitor, a work piece support, other hardware that is controllable according to the present teachings, or a combination thereof.

Thus, the computer application software, computer system, and the closed loop electronic control device, or a combination thereof may be in communication with the detector so that process parameters may be monitored as previously discussed herein and controlled. Controlling may be based upon a detected shape of a melt pool deposit. For example, a detected shape may cause the control system to change a processing condition such as one that affects melt pool surface tension, a feed condition, or both. Surface tension may be a characteristic that is detected and upon which adjustments to processing conditions are made.

The control device 20 may include a Linear PID (proportional-integral-derivative) style of control. The control device may be a single input single output system. The control device 20 may include a multi-input/multi-output (MIMO) routine which may have a variety of operating modes. It is appreciated that a fuzzy logic style of control may offer several advantages for this process as may be well suited for use with a MIMO system as well as both linear and non-linear processes. In such a control, input variables, output variables, or both, may be converted from hard scalar numbers to "fuzzy" sets which are represented by a suitable linguistic terms (e.g., a descriptive and/or relative terms, such as "big" or "small"). Thus, the control may make it possible to convert actions that a manual operator may perform into an automated operation. For example, the controller may interpolate and/or extrapolate input values, output values, or both by employing a series of "if-then" rules. Each variable may have its own unique "fuzzy" set assigned to it, which may be arranged and/or processed independently of other variables. For example, a beam power control operation may be independent of an X-Y deflection operation.

Examples of simple and complex control inputs and control outputs may include one that monitors for a predetermined condition and then adjusts one or more (e.g., preferably at least two) processing parameters in response to information from the monitoring. For example, a Simple Single Input Single Output (SISO) control may be employed where the melt pool width is monitored for a predetermined condition and the control then adjusts one or more processing parameters (e.g., an energy beam condition such as power) to alter the monitored condition. A Complex Multiple Input/Multiple Output control may include monitoring the melt pool width, melt pool shape, and/or peak temperature bias. Based upon information acquired from the monitoring, the controller may then adjust one or more processing parameters (e.g., at least two parameters, such as the energy beam condition, the wire feed rate, and/or beam deflection). A closed loop electronic control device may employ fuzzy logic, Fast Fourier Transform (FFT), software signal processing, or any combination thereof to alter a processing condition in response to a detected condition.

The time lapse between when a melt pool deposit is formed and when a condition is altered in response to a detected condition is rapid. For example, the response time may be about one minute or less, about 30 seconds or less, about 10 seconds or less, about 5 seconds or less, or even about 1 second or less. Thus, substantially real time condition adjustment is possible.

For testing and verification, at least one accelerometer optionally may be attached to the equipment to measure the gravitational forces and accelerations. Additionally, the process parameters may be recorded on the same time basis as the process monitoring instrumentation outputs. Examples of process parameters that may be monitored are: sealed housing environmental parameters (for example, temperature); beam parameters (for example, current, voltage, deflection and focusing coil parameters, raster patterns); vacuum levels (for example, pressure level); rate and location parameters; and wire feeder control parameters (for example, rate, start, and stop). A computer, having a user interface, may be employed for commanding and controlling the fabrication process. A human operator may evaluate the overall operation of the energy emission device, the material delivery device, positioning mechanisms, vacuum operating parameters, or any combination thereof. Though the objective of the present invention is to form an automatic system, some aspects of the present invention may be used in a process that requires human intervention. The closed loop electronic control device may be configured to make the appropriate command inputs through the monitoring system and control software, or both, to manage the various systems of the layer manufacturing process.

The present teachings also contemplate the possible use of an alignment fixture for use with an LM apparatus, and particularly an energy emission device. In general, an alignment fixture may be employed in a process of setting up the LM apparatus, calibrating the LM apparatus, or both. The alignment fixture may be positioned relative to the LM apparatus while adjustments are made to the orientation of one or more components of the LM apparatus. The orientation of the adjusted components may be fixed in a secure position and then the alignment fixture may be removed.

A suitable alignment fixture may include one or more features for simulating the position of one or more components of the LM apparatus relative to another, a site where a work piece may be located, or both. For example, an alignment fixture may include a support structure with a base portion and a guide surface portion. The alignment fixture may include an adjustable height work piece support simulator carried on the support structure that raises and lowers relative to the base portion along the guide surface portion. The alignment fixture may include an energy emission device orientation simulator disposed above the work piece support simulator on the support structure. The energy emission device orientation simulator may include an interface for alignment when mounting a detection device, an interface for alignment when mounting a deflection coil, a focusing coil, or a combination thereof. The support structure may have a perimeter that defines an interior region that may be accessible from at least one side of the support structure. The base portion may include a base member, which may be a plate. The guide surface portion may include at least one generally upright guide member. The at least one generally upright guide member may be a shaft. The at least one generally upright guide member may be temporarily or permanently mounted to the base member. The work piece support simulator may include a member that is mounted on the at least one generally upright guide member and is guidingly translated on the guide member. The work piece support simulator may include at least one plate having an opening through which the at least one generally upright guide member passes. The work piece support simulator may include a suitable bearing for allowing translation. For example, there may be at least one linear bearing disposed above and/or below the mounted member. The work piece support simulator may include at least one position adjustable device that interferes with translation of the work piece support simulator. For example, the adjustable device may be a collar that at least partially surrounds at least one of the generally upright guide members. The work piece support simulator may include a plate having at least one target alignment feature defined thereon for simulating a characteristic of the work piece support, a work piece on the support, or both.

The orientation simulator may include at least one first plate attached toward an upper end the support structure. For example, the at least one first plate may be attached (e.g., by press fit, weld, fastener, or otherwise) to the support structure via at least one shaft. The at least one first plate may have a (i) a generally upright wall for simulating mounting hardware for a detector, (ii) a second plate disposed beneath the plate and at least partially in the interior portion for simulating mounting hardware for a deflection coil; or (iii) both (i) and (ii).

In use, the fixture would allow vertical adjustment of components of the system. Further, the fixture structure allows it to receive one or more components of the LM apparatus and support the components while an adjustment is made. For example, one or any combination of steps may be employed by loosening or otherwise releasing at least one fastening attachment of at least one component, supporting (e.g., in a substantially flush fit) the at least one component on the alignment fixture while the at least one fastening attachment is in the loosened state, adjusting the orientation of the at least one component, re-securing the least one fastening attachment of the at least one component.

Figure 7:
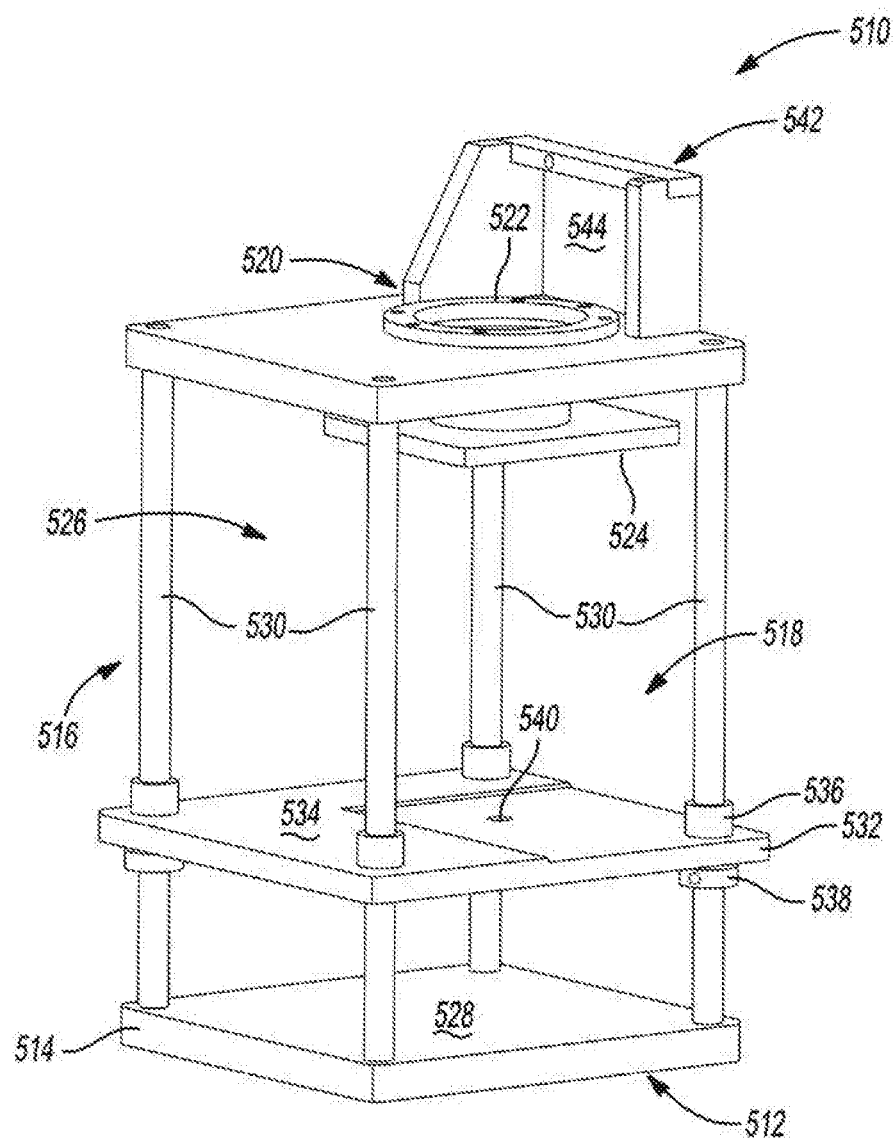
FIG. 7 is a perspective view of an alignment fixture.

With specific reference to FIG. 7, there is depicted in more particular detail an example of one such alignment fixture 510 in accordance with the present teachings. The alignment fixture 510 includes a support structure 512 including a base portion 514 and a guide surface portion 516. An adjustable height work piece support simulator 518 is carried on the support structure 512 that raises and lowers relative to the base portion along the guide surface portion 516.

An energy emission device orientation simulator 520 is disposed above the work piece support simulator 518 on the support structure 512. The energy emission device orientation simulator 520 may include a first interface 522 for alignment of mounting a detection device, a second interface 524 for alignment of mounting of a deflection coil, or both. The support structure may have a perimeter that defines an interior region 526 that may be accessible from at least one side of the support structure. The base portion may include a base member, which is illustrated as a plate 528. The guide surface portion 516 may include a number of generally upright guide shafts 530.

The work piece support simulator 518 may include a member 532 that may be mounted on the at least one generally upright guide member and may be guidingly translated on the guide member. The work piece support simulator 518 may include a plate 534 that may have openings through which the guide shafts may pass, and which the plate may bear against the shafts. The work piece support simulator 518 is depicted as having multiple linear bearings 536 for allowing translation. The work piece support simulator 518 may also include a collar 538 that may interfere with translation of the work piece support simulator. The plate 534 of the work piece support simulator 518 may have at least one target alignment feature 540 defined thereon for simulating a characteristic of the work piece support, a work piece on the support, or both.

The orientation simulator 520 is illustrated as having at least one first plate 542 attached toward an upper end the support structure. The at least one first plate 542 may have a generally upright wall 544 for simulating mounting hardware for a detector and a second plate 546 disposed beneath the plate and at least partially in the interior portion for simulating mounting hardware for a deflection coil.

The present invention may further provide a method (e.g., process) for layer manufacturing of a three-dimensional work piece. For example, the layer manufacturing process may include feeding raw material in a solid state to a first predetermined location. The raw material may be deposited onto a substrate (e.g., work piece support 16) as a molten pool deposit under a first processing condition. The molten pool deposit may be monitored for a preselected condition (e.g., using the monitoring system as described previously). Information about the preselected condition of the monitored molten pool deposit may be compared with a predetermined desired value for the preselected condition of the monitored molten pool deposit, such as by use of the closed loop control device previously described, and the first processing condition may be automatically altered (e.g., by the closed loop control device) based upon information obtained from the comparing step. The molten pool deposit may be solidified and/or allowed to solidify. The steps may be repeated at one or more second locations for building up layer by layer a three-dimensional work piece.

Any comparing step performed by the control device may be performed in any suitable manner. As indicated, one possible approach is to use "IF X AND Y THEN Z" rules, which may employ linguistic variables.

The process may further include the step of translating one or any combination of the previously described apparatus components such as the material delivery device, the energy emission device, the work piece support (e.g., substrate), or the detector during use of the apparatus.

The step of feeding raw material may include advancing a metal wire feedstock (e.g., having an average diameter of less than about 5 mm) through a wire feed device that may include a plurality of opposing spaced apart rollers.

During the monitoring step, the detector 18 may optically monitor at least one molten pool deposit. More particularly, the monitoring step may include monitoring a condition associated with the molten pool deposit selected from bulk average temperature of the molten pool deposit, temperature gradient within the molten pool deposit, surface topography of the molten pool deposit, the presence of any liquid-solid interface in the molten pool deposit, surface profile of the molten pool deposit, chemical analysis of the molten pool deposit, or any combination thereof. The preselected condition of the monitored molten pool deposit may be a predetermined value that is stored in memory of a computer processing system. The preselected condition of the monitored molten pool deposit may also be a value of a previously measured molten pool deposit of the same or a different work piece, or both. The information obtained from any monitoring step may be stored in memory and may be used subsequently to repair or replace a portion of the work piece. Any monitoring step may include monitoring at least one molten pool deposit in the absence of applying an external influence to induce oscillations of the weld pool deposit.

In the monitoring step, the orientation of the detector 18, the reflective substrate, or both, relative to a first location about the melt pool, may be generally constant so that information about the preselected condition of the molten pool may be obtained from generally similar locations of the melt pool as the melt pool progresses during the deposition. In another feature of the monitoring step, the orientation of the detector 18, the reflective substrate, or both relative to a first location about the melt pool may be generally variable so that information about the preselected condition of the molten pool may be obtained from various locations (e.g., progressively scanning) of the melt pool as the melt pool progresses during the deposition.

The step of automatically altering the first processing condition to a different processing condition may be performed by one or more electronic processing units (e.g., computer). The step of automatically altering the first processing condition to a different processing condition may include altering one or more conditions previously discussed herein. For example, the location of any device for supplying energy to melt the raw material; the location of any device used for feeding the raw material; the location of any platform upon which a work piece is built; the pressure of any environment in which the processing is performed; the temperature of any environment in which the processing is performed; the voltage supplied to melt the raw material; the beam used for any electron beam source of energy for melting the raw material; the feed rate of the raw material; the composition of the deposited material; changing the temperature of the work piece; the temperature of the platform; or any combination thereof, may be altered.

The methods may further include the step of repairing a damaged portion of the work piece by locating a stored monitored location that is relative to the damaged portion of the work piece, changing the preselected value to the stored monitored value; depositing melted raw material at the damaged portion while monitoring the deposited material until a second monitored value is determined that is the same as the preselected value; and advancing the deposition of melted raw material until a second monitored value is determined that is the same as the preselected value. The method may include the step of utilizing a proximity device (e.g., laser) to measure the substrate distortion and subsequently map out the Z location for each deposition pass. The closed loop control may be used to maintain a consistent melt pool, wherein height profiling may also be incorporated. Height profiling may be utilized in a pre-scan mode with a measurement accuracy of generally up to about 0.8 mm (e.g., about 0.10 mm to about 0.30 mm).

The establishment of processing parameters may be by trial and error. It may be based upon historical experience. It may be based upon one or more test methodology. By way of example, one approach may include comparing results of at least one deposition test run with known values obtained from a reference structure having known values. The reference structure having known values may be placed in a predetermined known location within the system. Images may be taken with a detector and compared against known data about the reference structure having known values, and adjustments may be made to reduce the differences between the measured data and the known data. For example, the parameters may be varied above and below the baseline parameters (e.g., in terms of focus) to iteratively find optimal settings. Each test may produce one or more digital file that contains collected data. A test log may be employed for manual entry by an observing operator. Resulting images may be evaluated against known values; (e.g., contrast between known features/signal to noise, accuracy of features in the X-Y plane, and depth of field sensitivity in the Z-direction).

The present invention may include an article of manufacture made using the LM method, the LM apparatus, or both. The method of making the articles may result in a near net shape part that may be ready for finish machining. The article of manufacture may be an original equipment component, a replacement part, or a repaired original equipment component. The article may be heat-treated subsequent to its layer by layer manufacture. The article may be an aircraft component, a rocket component, a marine craft component, a railcar component, an automotive vehicle component, a chemical processing component, a turbine component, or a space vehicle component.

In one embodiment, the article may exhibit a resulting substantially homogeneous microstructure, which is obtained throughout at least about 50% (and more preferably at least about 80%) of a section thickness of the article. For example, the article may be a substantially homogeneous microstructure having a plurality of columnar grains that is obtained throughout at least about 50% (and more preferably at least about 80%) of a section thickness of the article.

Relatively large articles (e.g., greater than 750 $cm^3$) may be metallic and may be made (e.g., the processes being completed) in a period of less than about 150 hours (e.g., less than about 100 hours, preferably less than about 50 hours, or even more preferably less than about 20 hours) for each article. The article may be prepared directly from computer-aided design data. The article of manufacture may have an overall weight of at least about 10 kg, and may be made in a period of less than about 20 hours. For example, an article weighing about 60 to about 150 kg (or more) may be made in a period of no longer than about 20 hours.

The article may be prepared using a process, apparatus, or both that may be: free of a laser, prepared from a continuous deposition of each individual layer, prepared from an intermittent deposition of each individual layer, prepared in the absence of processing condition adjustment by a human during layer by layer buildup, or any combination thereof. It may be free of an ultrasonic detection method.

Any depositing step may be performed so that the molten pool deposit undergoes a substantially continuous change in thermal condition in three-dimensions throughout the process. The steps may be performed at a rate sufficient to deposit successive layers at least about 2.5 kg of the raw material per hour, preferably at least 3 kg per hour (e.g., about 3.3 to about 6.8 kg per hour). The steps may be performed at a rate sufficient to deposit the raw material as a plurality of beads that define successive layers having an average bead width of about 10 to about 15 mm (e.g., about 12.7 mm) at a rate of at least about 25 cm of bead per minute (e.g., about 35 to 80 cm per minute or higher). The process may be interrupted for a period (e.g., of at least one minute, one hour, two hours, one day, or longer) prior to completion of the work piece, and may be resumed after complete solidification of the work piece has occurred.

Any material delivery device may include a wire feed device (e.g. a wire guide 26) that includes a plurality of opposing spaced apart rollers that advances a wire feedstock. Any detector or sensing device may include a mechanism that intermittently acquires data about deposited material (e.g., at a rate faster than about 25 images per second). Any detector or sensing device may include a shutter mechanism located within an evacuated chamber that reduces exposure of the detector to vapors from the raw material.

The following process steps and features may be employed with any of the embodiments or devices taught herein. The following features may be employed separately or in combination with any of the embodiments taught herein. The process may use a raw material that includes a metal selected from one or any combination or alloy of metals selected from titanium, aluminum, iron, inconel, cobalt, stainless steel, niobium, tantalum, copper, bronze, brass, beryllium copper, or tungsten. The process may be interrupted for a period (e.g., of at least one minute, one hour, two hours, one day, or longer) prior to completion of the work piece, and is resumed after complete solidification of the work piece has occurred. The monitoring step may include, employing as the image generating device, a digital camera, a charged coupled device (CCD), a complementary metal oxide semiconductor (CMOS), or a combination thereof, and includes generating images substantially in real time at a rate of at least 25 frames per second. The monitoring step may include monitoring a condition associated with the molten pool deposit from a location substantially overhead of the molten pool deposit, and optionally the condition is selected from bulk average temperature of the molten pool deposit, temperature gradient within the molten pool deposit, surface topography of the molten pool deposit, the presence of any liquid-solid interface in the molten pool deposit, surface profile of the molten pool deposit, chemical analysis of the molten pool deposit, or any combination thereof. A preselected condition of the monitored molten pool deposit may be a predetermined value that is stored in memory of a computer processing system, the preselected condition of the monitored molten pool deposit is a value of a previously measured molten pool deposit of the same or a different work piece, or both. The step of automatically altering the first processing condition to a different processing condition includes altering one or more conditions selected from the location of any device for supplying energy to melt the raw material; the location of any device used for feeding the raw material; the location of any platform upon which a work piece is built; the pressure of any environment in which the processing is performed; the temperature of any environment in which the processing is performed; the voltage and/or current supplied to melt the raw material; the beam used for any electron beam source of energy for melting the raw material (e.g., by changing the power to generate the beam, the beam width, or both); the feed rate of the raw material; the feed angle of the raw material; the composition of the deposited material; changing the temperature of the work piece; the temperature of the platform; or any combination thereof. The information obtained from any monitoring step may be stored in memory and optionally is used subsequently to repair or replace a portion of the work piece.

The following process steps and features may be employed with any of the embodiments or devices taught herein The following features may be employed separately or in combination with any of the embodiments taught herein. The process may further comprising the step of repairing a damaged portion of the work piece by locating a stored monitored location that is relative to the damaged portion of the work piece; changing the preselected value to the stored monitored value; depositing melted raw material at the damaged portion while monitoring the deposited material until a second monitored value is determined that is the same as the preselected value; and advancing the deposition of melted raw material until a second monitored value is determined that is the same as the preselected value. The monitoring step may include a step of protecting at least one exposed optical component of a detector from vapor disposition build-up onto the exposed componentry, so that the vapor does not build up and adversely affect measurement integrity. The monitoring step may include a step of cooling a detector by flowing a fluid in a housing of the detector for removing heat from the detector and the housing is separate and spaced apart from any block with an aperture of any vapor protection device. The process may further comprise a step of aligning components of an apparatus for performing the process using an alignment fixture. The step of monitoring may include a step of obtaining an optical image from a point of view that is substantially overhead of the melt deposit. The step of obtaining an optical image wherein (i) the image from the substantially overhead view of the molten pool deposit is generally shaped to include a generally C-shaped portion with a generally circular or elliptical shaped portion, which corresponds to an image of the feed material, that is within the C-shaped portion, and possibly extending outside the opening of the C-shaped portion, (ii) the step of automatically altering includes changing a process condition so that the shape of the image is substantially axially symmetrical; or both (i) and (ii). The orientation of any feed of the raw material may be automatically changed in response to information obtained during the monitoring step.

The following features of the camera cooled housing may be employed with any of the embodiments taught herein. The following features may be employed separately or in combination with any of the embodiments taught herein. The cooled housing may include a front flange, seals, spacers, and back flange that are connected together by a fastening device, and the printed circuit boards are attached to the spacer by a connection device. The rear flange may include an opening for receiving an energy source. The cooled housing may include: (i) the mount adapter is located in the center of the front flange, (ii) the mount adapter is secured in the front flange using a plurality of pins; or (iii) both (i) and (ii). The cooled housing may include: a front flange, spacers, seals, and rear flange that are generally rectangular-shaped. The housing may have a height to width aspect ratio of about 2 to 1, preferably about 1.5 to 1, and more preferably about 1 to 1.2. The inlet and outlet may be located on opposite sides of the front flange in generally opposing facing relationship to each other. The cooled housing may include: (i) the spacers and seals include one or more heat sinks; (ii) one or more of the seals conduct heat; or both (i) and (ii). The cooled housing may include: a thermally conductive (e.g., at least about 2 W/m-K per ASTM D2214) polymeric-based interface seal is employed between the flanges, and optionally wherein the interface seal includes a relatively rigid polymeric (e.g., acrylic) elastomer surface layer having a relatively low tack surface, and an underlying relatively flexible polymeric (e.g., acrylic) support layer having a relatively low tack surface that may be more tacky than the surface layer. The camera cooled housing may be used in any of the process steps described herein.

The following features of the vapor protection device may be employed with any of the embodiments taught herein. The following features may be employed separately or in combination with any of the embodiments taught herein. The vapor protection device may include a gas supply conduit connected with the at least one fluid port for supplying the gas stream. The base portion and the cover portion may be separable from each other for accessing a flow chamber defined in the block and through which the gas stream is flowed. The vapor protection device may include a protective window, which is optionally edge sealed by opposing spaced seals, is housed in the base portion between the apertures of the cover portion and the base portion and the reflective substrate. The at least one fluid port may be defined by an elongated bore formed in a side wall of the base portion, and the bore has a longitudinal axis generally in the direction of elongation. The longitudinal axis of the elongated bore is substantially parallel with the optical path of an image between the reflective substrate and a camera. The vapor protection device taught herein may include a cooled housing taught herein. The vapor protection device may be carried on a common frame as with the cooled housing, but is spaced apart from the cooled housing so that the vapor protective device is located generally overhead of the molten pool deposit while the cooled housing is longitudinally separated from the vapor protective device and any gas supply line for the vapor protection device is free of connection with the cooled housing. The common frame may include a plurality of spaced apart elongated members along which the cooled housing, the vapor protection device or both may be mounted for adjustable and slidable translation relative to each other. The vapor protection device may be used in any of the process steps discussed herein.

The following features of the alignment fixture may be employed with any of the embodiments taught herein. The following features may be employed separately or in combination with any of the embodiments taught herein. The alignment fixture may include support structure has a perimeter that defines an interior region that is accessible from at least one side of the support structure. The alignment fixture may include: (i) the base portion includes a base member that is a plate; (ii) the guide surface portion includes at least one generally upright guide member; or both (i) and (ii). The alignment fixture may include: (i) the at least one generally upright guide member is a shaft; (ii) the at least one generally upright guide member is temporarily or permanently mounted to the base member; or both (i) and (ii). The work piece support simulator may include a member that is mounted on the at least one generally upright guide member and is glidingly translated on the guide member. The alignment fixture may include at least one plate having an opening through which the at least one generally upright guide member passes. The alignment fixture may include one or more suitable bearings for allowing translation, which optionally may be linear bearings disposed above or below the mounted member. The alignment fixture may include at least one position adjustable device that interferes with translation of the work piece support simulator, which optionally may be a collar that at least partially surrounds at least one of the generally upright guide members. The alignment fixture may include a plate having at least one target alignment feature defined thereon for simulating a characteristic of the work piece support, a work piece on the support, or both. The alignment fixture may be used with any of the teachings of the cooled camera housing, the vapor protection device, or both. The alignment fixture may be used with any of the process steps discussed herein.

The following features of the apparatus for layer manufacturing a three-dimensional article may be employed with any of the embodiments taught herein. The following features may be employed separately or in combination with any of the embodiments taught herein. The material delivery device includes a wire feed device that includes a plurality of opposing spaced apart rollers that advances a wire feedstock. The apparatus includes a detector that consists essentially of a camera that acquires images that are substantially overhead of the molten pool deposit at a rate of at least about 25 frames per second. The apparatus may be used with a cooled camera housing, a vapor protection device, an alignment fixture, or a combination thereof. The apparatus may be used to perform any of the process steps described herein. The apparatus may assembled using an alignment fixture described herein. The apparatus may be used to manufacture an original equipment component, a repaired original equipment component, or a replacement component made using the process described herein.

The following features of an article of manufacture may be manufactured using any of the embodiments taught herein. The following features may be employed separately or in combination with any of the embodiments taught herein. The article of manufacture may be heat-treated subsequent to its layer by layer manufacture. The article may be an aircraft component, a rocket component, a marine craft component, a railcar component, an automotive vehicle component, a chemical processing component, a turbine component, or a space vehicle component; and wherein the article is metallic.

Structural relations, proportions, dimensions and geometries shown in the accompanying drawings are part of the teachings herein, even if not articulated verbally in the present detailed description. The teachings herein also contemplate variations to any relative proportions and dimensions shown in the drawings; e.g., variations within about ±10%, about ±25%, or even about ±50% are possible.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints. The specification of ranges herein also contemplates individual amounts falling within the range. Thus, for example, a range of 10 to 15 contemplates individually the amounts of 10, 11, 12, 13, 14, and 15.

The disclosures of all articles and references, including patent applications and publications, are incorporated by reference for all purposes. References to the term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of, or even consist of, the elements, ingredients, components or steps.

Plural elements, ingredients, components, or steps can be provided by a single integrated element, ingredient, component, or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps. Likewise, any reference to "first" or "second" items is not intended to foreclose additional items (e.g., third, fourth, or more items); such additional items are also contemplated, unless otherwise stated. Any references herein to elements or metals belonging to a certain Group refer to the Periodic Table of the Elements published and copyrighted by CRC Press, Inc., 1989. Any reference to the Group or Groups shall be to the Group or Groups as reflected in this Periodic Table of the Elements using the IUPAC system for numbering groups.

The teachings of the relative positions, orientations, and proportions of components depicted in the accompanying drawings also form part of the teachings herein even if not expressly stated.

It is understood that the above description is intended to be illustrative and not restrictive. Many embodiments as well as many applications besides the examples provided will be apparent to those of skill in the art upon reading the above description. It is further intended that any combination of the features of different aspects or embodiments of the invention may be combined. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

The invention claimed is:

1. A process for layer manufacturing a three-dimensional work piece comprising the steps of:
   (a) feeding raw material in a solid state to a first predetermined location;
   (b) depositing the raw material onto a substrate as a molten pool deposit under a first processing condition;
   (c) monitoring the molten pool deposit for a preselected condition using a detector substantially contemporaneously with the depositing step;
   (d) comparing information about the preselected condition of the monitored molten pool deposit with a predetermined desired value for the preselected condition of the monitored molten pool deposit;
   (e) solidifying the molten pool deposit;
   (f) automatically altering the first processing condition to a different processing condition based upon information obtained from the comparing step (d);
   (g) protecting the detector with a vapor protection device so that the vapor does not build up and adversely affect measurement integrity of the detector; and
   (h) repeating steps (a) through (g) at one or more second locations for building up layer by layer a three-dimensional work piece.

2. The process of claim 1, wherein the steps are performed at a rate sufficient i) to deposit at least about 0.05 cm3 of the raw material per hour; ii) to deposit the raw material as a bead having an average width of about 10 to about 15 mm at a rate of at least about 25 cm per minute.

3. The process of claim 1, wherein the raw material includes a metal selected from one or any combination or alloy of metals selected from titanium, aluminum, iron, inconel, cobalt, stainless steel, niobium, tantalum, copper, bronze, brass, beryllium copper, or tungsten.

4. The process of claim 1, wherein the process is interrupted for a period prior to completion of the work piece, and is resumed after complete solidification of the work piece has occurred.

5. The process of claim 1, wherein the monitoring step (c) includes employing as the detector device a digital camera, a charged coupled device (CCD), a complementary metal oxide semiconductor (CMOS), or a combination thereof, and includes generating images substantially in real time at a rate of at least 25 frames per second.

6. The process of claim 1, wherein the monitoring step (c) includes monitoring the preselected condition that is selected from bulk average temperature of the molten pool deposit, temperature gradient within the molten pool deposit, surface topography of the molten pool deposit, the presence of any liquid-solid interface in the molten pool deposit, surface profile of the molten pool deposit, chemical analysis of the molten pool deposit, or any combination thereof.

7. The process of claim 6, wherein the preselected condition of the monitored molten pool deposit is a predetermined value that is stored in memory of a computer processing system, the preselected condition of the monitored molten pool deposit is a value of a previously measured molten pool deposit of the same or a different work piece, or both.

8. The process of claim 1, wherein the step (f) of automatically altering the first processing condition to a different processing condition includes altering one or more conditions selected from the location of any device for supplying energy to melt the raw material; the location of any device used for feeding the raw material; the location of any platform upon which a work piece is built; the pressure of any environment in which the processing is performed; the temperature of any environment in which the processing is performed; the voltage and/or current supplied to melt the raw material; a beam used for any electron beam source of energy for melting the raw material; the feed rate of the raw material; the feed angle of the raw material; the composition of the deposited material; changing the temperature of the work piece; the temperature of the platform; or any combination thereof.

9. The process of claim 1, wherein information obtained from any monitoring step (c) is stored in memory and optionally is used subsequently to repair or replace a portion of the work piece.

10. The process of claim 9, further comprising the step of repairing a damaged portion of the work piece by locating a stored monitored location that is relative to the damaged portion of the work piece; changing the preselected value to the stored monitored value; depositing melted raw material at the damaged portion while monitoring the deposited material until a second monitored value is determined that is the same as the preselected value; and advancing the deposition of melted raw material until a second monitored value is determined that is the same as the preselected value.

11. The process of claim 1, wherein the raw material is a plurality of wires that are fed from one or more material delivery devices.

12. The process of claim 11, wherein the one or more material delivery devices are two or more material delivery devices.

13. The process of claim 11, wherein the plurality of wires are fed from the one or more material delivery devices at one or more angles and/or distances from the plurality of successively deposited molten pool deposits.

14. The process of claim 1, wherein the monitoring step includes a step of cooling a detector by flowing a fluid in a housing of the detector for removing heat from the detector.

15. The process of claim 11, wherein the plurality of wires are a same material type.

16. The process of claim 1, wherein the monitoring step includes a step of cooling a detector by flowing a fluid in a housing of the detector for removing heat from the detector and the housing is separate and spaced apart from any block with an aperture of any vapor protection device.

17. The process of claim 1, further comprising a step of aligning components of an apparatus for performing the process using an alignment fixture.

18. The process of claim 1, wherein the step of depositing the substrate as a molten pool includes melting the raw material with an electron beam and the method includes a step of rastering the electron beam in a pattern.

19. The process of claim 18, wherein (i) the image of the molten pool deposit is generally shaped to include a generally C-shaped portion with a generally circular or elliptical shaped portion, which corresponds to an image of the feed material, that is within the C-shaped portion, and possibly extending outside the opening of the C-shaped portion, (ii) the step of automatically altering includes changing a process condition so that the shape of the image is substantially axially symmetrical; or both (i) and (ii).

20. The process of claim 19, wherein the orientation of any feed of the raw material is automatically changed in response to information obtained during the monitoring step.

\* \* \* \* \*